United States Patent
Hogan et al.

(10) Patent No.: US 10,888,830 B2
(45) Date of Patent: Jan. 12, 2021

(54) METHODS AND DEVICES BASED UPON A NOVEL FORM OF NUCLEIC ACID DUPLEX ON A SURFACE

(71) Applicants: Genomics USA, Inc., Round Rock, TX (US); BAYLOR COLLEGE OF MEDICINE, Round Rock, TX (US)

(72) Inventors: Michael E. Hogan, Tucson, AZ (US); Joseph G. Utermohlen, Tucson, AZ (US); Frederick H. Eggers, Oro Valley, AZ (US); Krishna Jayaraman, Round Rock, TX (US)

(73) Assignees: Genomics USA, Inc., Round Rock, TX (US); Baylor College of Medicine, Houston, TX (US)

( * ) Notice: Subject to any disclaimer, the term of this patent is extended or adjusted under 35 U.S.C. 154(b) by 0 days.

(21) Appl. No.: 15/926,761

(22) Filed: Mar. 20, 2018

(65) Prior Publication Data
US 2019/0209996 A1    Jul. 11, 2019

Related U.S. Application Data

(60) Division of application No. 12/080,720, filed on Apr. 4, 2008, now Pat. No. 10,272,409, which is a continuation-in-part of application No. 10/193,938, filed on Jul. 11, 2002, now Pat. No. 7,354,710.

(60) Provisional application No. 60/304,500, filed on Jul. 11, 2001.

(51) Int. Cl.
C12Q 1/68 (2018.01)
B01J 19/00 (2006.01)

(52) U.S. Cl.
CPC ...... *B01J 19/0046* (2013.01); *B01J 2219/005* (2013.01); *B01J 2219/00376* (2013.01); *B01J 2219/00497* (2013.01); *B01J 2219/00576* (2013.01); *B01J 2219/00605* (2013.01); *B01J 2219/00653* (2013.01); *B01J 2219/00659* (2013.01); *B01J 2219/00677* (2013.01); *B01J 2219/00691* (2013.01); *B01J 2219/00722* (2013.01)

(58) Field of Classification Search
None
See application file for complete search history.

(56) References Cited

U.S. PATENT DOCUMENTS

| | | |
|---|---|---|
| 5,610,287 A | 3/1997 | Nikiforov et al. |
| 5,744,305 A | 4/1998 | Fodor et al. |
| 5,807,522 A | 9/1998 | Brown et al. |
| 5,959,098 A | 9/1999 | Goldberg et al. |
| 6,024,925 A | 2/2000 | Little et al. |
| 6,034,775 A | 3/2000 | McFarland et al. |
| 6,048,695 A | 4/2000 | Bradley et al. |
| 6,077,674 A | 6/2000 | Schleifer et al. |
| 6,221,653 B1 | 4/2001 | Caren et al. |
| 6,271,957 B1 | 8/2001 | Quate et al. |
| 6,291,166 B1 | 9/2001 | Gerdes et al. |
| 6,316,608 B1 | 11/2001 | Reynolds et al. |
| 6,346,413 B1 | 2/2002 | Fodor et al. |
| 6,355,420 B1 | 3/2002 | Chan |
| 6,465,178 B2 | 10/2002 | Chappa et al. |
| 6,492,118 B1 | 12/2002 | Abrams et al. |
| 6,670,461 B1 | 12/2003 | Wengel et al. |
| 6,861,214 B1 | 3/2005 | Rampal et al. |
| 7,354,710 B2 | 4/2008 | Hogan et al. |
| 2003/0134299 A1 | 7/2003 | Hogan et al. |
| 2003/0218130 A1 | 11/2003 | Boschetti |

FOREIGN PATENT DOCUMENTS

| | | | |
|---|---|---|---|
| EP | 0391608 A2 | 10/1990 | |
| WO | 200106011 A2 | 1/2001 | |
| WO | WO-0106011 A2 * | 1/2001 | ........... C12Q 1/6837 |
| WO | 2002061146 A1 | 8/2002 | |
| WO | 2003006675 A2 | 1/2003 | |

OTHER PUBLICATIONS

Non-Final Office Action dated Mar. 29, 2018 in related Canadian Application No. 2720460.
Frutos et al., "Demonstration of a word design strategy for DNA computing on surface," Nucleic Acids Research, 1997, vol. 25, No. 23, pp. 4748-4757.
Bensimon D et al., "Stretching DNA with a receding meniscus: Experiments and models" Phys. Rev. Lett. 74:4754-4757, 1995.
Cheung VG et al., "Making and reading microarrays" Nature Genetics 21(1 Suppl):15-19, 1999.
Gao Q et al., "Drug-Induced DNA Repair: X-ray Structure of a Dna-Ditercalinium Complex" Proc. Natl. Acad. Sci. USA 88:2422-2426, Mar. 1991.
Lebrun A et al., "Modelling extreme stretching of DNA" Nucleic Acids Res. 24:2260-2267, 1996.
RNeasy Micro Handbook, "For isolation of total RNA from microdissected tissues, small amounts of tissues, small amounts of fibrous tissues, small number of cells, and for RNA cleanup and concentration", Apr. 2003.

(Continued)

*Primary Examiner* — Young J Kim
(74) *Attorney, Agent, or Firm* — Ramey & Schwaller, LLP

(57) ABSTRACT

Provided herein are biomolecular hybridization devices comprising a substrate with a permanently and covalently attached surface of functional groups and an adsorbed monolayer of unmodified, single-stranded oligonucleotides all of which are 10 to about 24 bases in length as a saturated film of constrained oligonucleotides on the surface via direct non-covalent phosphate-surface adsorptive contact of substantially all phosphate groups of each oligonucleotide. The constrained oligonucleotides are effective to dissociably hybridize to a complementary single-stranded nucleic acid with asymmetric, non-helical base pairing and without oligonucleotide dissociation from the surface of the device. Also, provided are methods for hybridizing solution-state target nucleic acids to probe nucleic acids and for identifying a nucleotide sequence to which a nucleotide-binding protein binds using the biomolecular hybridization devices.

19 Claims, 15 Drawing Sheets

Specification includes a Sequence Listing.

(56) References Cited

OTHER PUBLICATIONS

Smith SB et al., "Overstretching B-DNA: the elastic response of individual double-stranded and single-stranded DNA molecules" Science 271:795-799, 1996.
Sowerby, S. et al., "Differential adsorption of nucleic acid bases: Relevance to the origin of life", PNAS, vol. 98, No. 3, pp. 820-822, Jan. 30, 2001.
Timofeev et al., "Binding Specificity and Stability of duplexes formed by modified oligonucleotides with a 4096-hexanucleotide mocroarray", Nucleic Acids Research, vol. 29, No. 12, pp. 2626-2634, 2001.
Notice of Allowance dated Jul. 4, 2017 for corresponding Japanese Application No. 2015-095100.
Belosludtsev Y et al., DNA microarrays based on noncovalent oligonucleotide attachment and hybridization in two dimensions• Anal. Biochem. 292:250-256 (2001).
Belosludtsev Y et al., Nearly Instantaneous, cation-Independent, high selectivity nucleic acid hybridization to DNA micrcarrays• Blochem Blophys Res Commun. 282:1263-1267 (2001).
Dickerson RE, "DNA structure from A to Z" Methods Enzymol. 211:67-111 (1992).
Duggan DJ el al., "Expression profiling using cDNA microarrays" Nature Genellcs 21(1 Suppl):10-14 (1999).
Holmstrom Ket al., 1993, "A highly sensitive and fast nonradioactive method for detection of polymerase chain reaction products" Anal. Biochem. 209(2):278-283.
Koltover, I et al., "An Inverted hexagonal phase of cationic liposome-ONA complexes related to DNA release and delivery" Science, www.sciencemag.org, vol. 281, pp. 78-81 (1998).
Leger JF et al., 1999, Phys.Rev. Lett. 83:1066-1069, 1999.
Lemeshko SV et al., "Oligonucleotides form a duplex with non-helical properties on a positively charged surface" Nucleic Acids Research 29(14):3051-:3058, 2001.
Lindsay SM, The Scanning Probe Microscope in Biology, draft available at http://green.la.asu.edu/review/chap_7(3-5).htm, printed Feb. 7, 2005.
McConnell KJ et al., "DNA structure: what's in charge?" J. Mol. Biol. 304:803-820, 2000.
Mltzutalnl, Tadaharu, Adsorption Chromatography of Nucleic Acids on Silicone-Coated Porous Glass•, J. Biochem, vol. 94, pp. 163-169, 1983.
RNeasy Micro Handbook, "For isolation of total RNA from microdissected tissues, small amounts of tissues, small amounts of fibrous tissues, small numbers of cells and for RNA cleanup and concentration" Apr. 2003.
Rhodes D, et al. "Helical periodicity of DNA determined by enzyme digestion" Nature 286:573-578, 1980.
Saldltt, T. et al., "Self-assembled DNA-Cationic-Lipid complexes: Two-dimensional smectic ordering, correlations, and Interactions" The Amer Physical Society vol. 58 No. 1. pp. 903, Jul. 1998.
Schena M et al., "Quantitative monitoring of gene expression patterns with a complementary DNA mlcroarray" Science 270(5235):467-470 (1995).
Singh, N. et al., Boronate affinity adsorption of RNA: possible role of conformational changes- Jml of Chromatography A, 840. pp. 205-213, 1999.
Wirth MJ available at http:/www.udel.edu/chem/wirth/ollgas.html printed Feb. 7 2005.
A second set of Cy3-labeled DNA 50-mers were adsorbed on to a uniform cationic surface according to the solution dip method of Cel Associates (CSA-25; http://www.cel-1.com/), 2001.
Lvov et al., "Assembly of Thin Films by Means of Successive Deposition of Alternate Layers of DNA and Poly (allylamine)," Macromolecules, 1993, vol. 26, pp. 5396-5399.
Notification of Refusal for corresponding Japanese Patent Application No. 2003-512432 dated Jun. 18, 2008.
Decision of Refusal for corresponding Japanese Patent Application No. 2011-502988 dated Dec. 22, 2014.
Notification of Refusal for corresponding Japanese Patent Application No. 2011-502988 dated Dec. 20, 2013.
Written Opinion for corresponding Japanese Patent Application No. 2011-502988 dated Jun. 30, 2014.
Notification of Refusal for corresponding Japanese Patent Application No. 2015-095100 dated Feb. 26, 2016.
Notification of Refusal for corresponding Japanese Patent Application No. 2015-095100 dated Jan. 26, 2017.
Examination Report for corresponding Indian Patent Application No. 7771/DELNP/2010 dated May 31, 2017.
Notification of Oral Hearing for corresponding Indian Patent Application No. 7771/DELNP/2010 dated Aug. 7, 2018.
Examination Report for corresponding Australian Patent Application No. 2009251843 dated Mar. 7, 2013.
Supplementary European Search Report for corresponding European Patent Application No. 02748133 dated May 12, 2005.
Examination Report for corresponding European Patent Application No. 02748133.2 dated Sep. 9, 2005.
Summons to Attend Oral Proceedings for corresponding European Patent Application No. 02748133.2 dated Feb. 1, 2008.
Supplementary European Search Report for corresponding European Patent Application No. 09755199 dated May 11, 2012.
Examination Report dated Mar. 28, 2013 for corresponding European Patent Application No. 09755199.

* cited by examiner

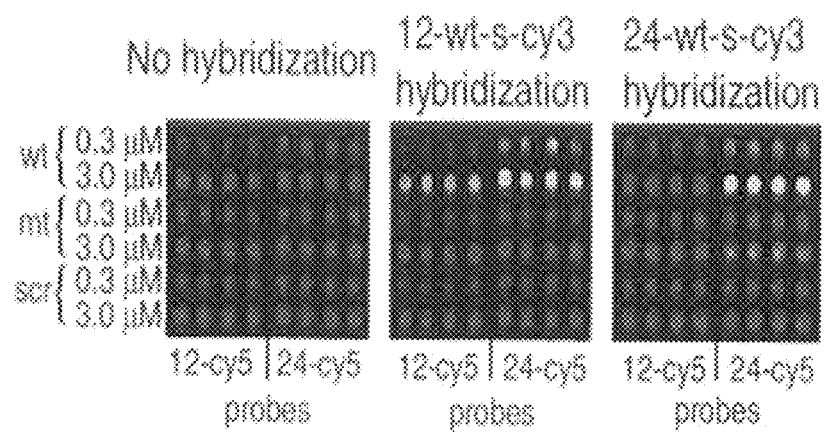
Fig. 2A   Fig. 2B   Fig. 2C
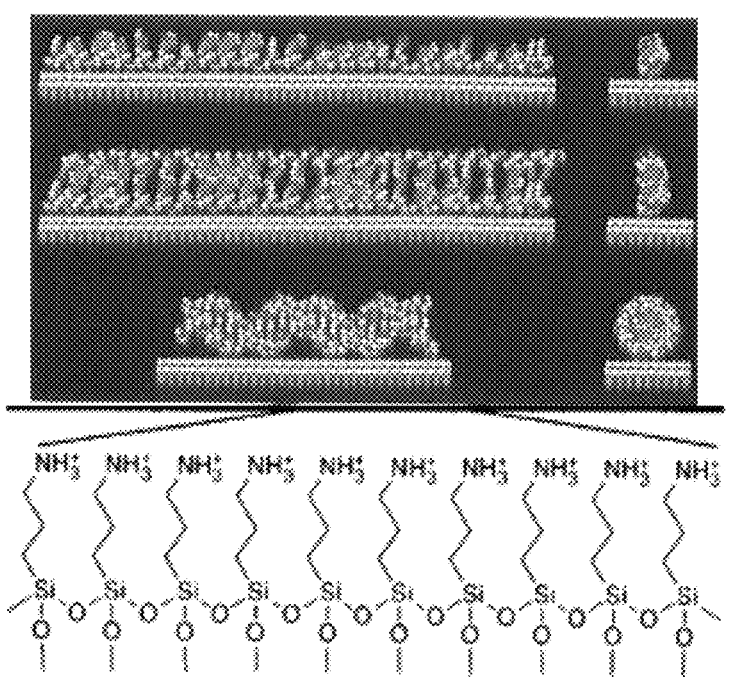
Fig. 3A
Fig. 3B
Fig. 3C
Fig. 3D

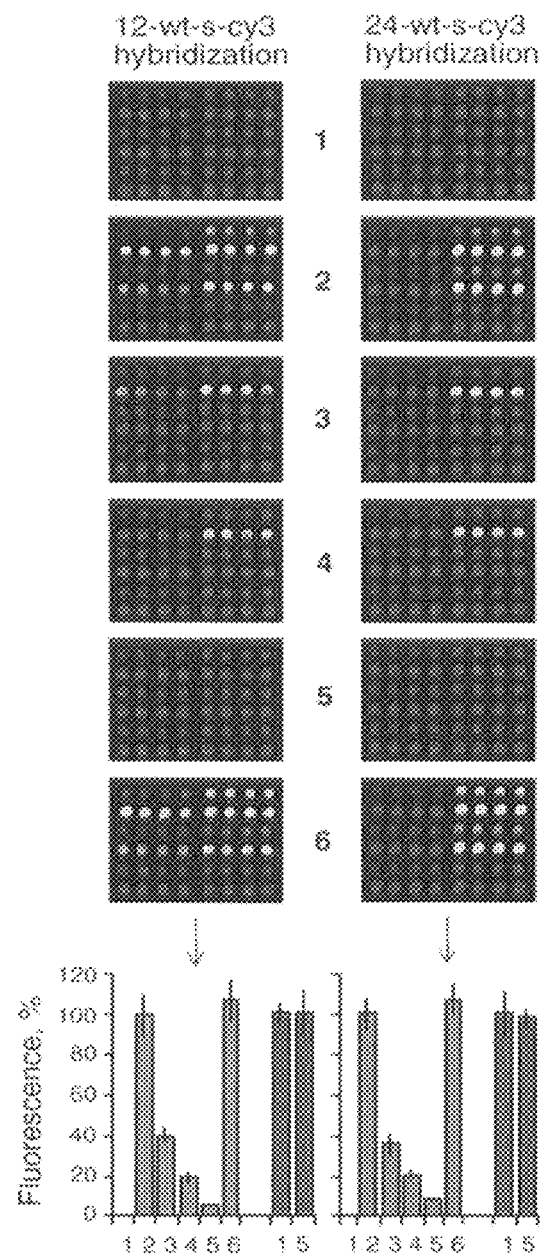

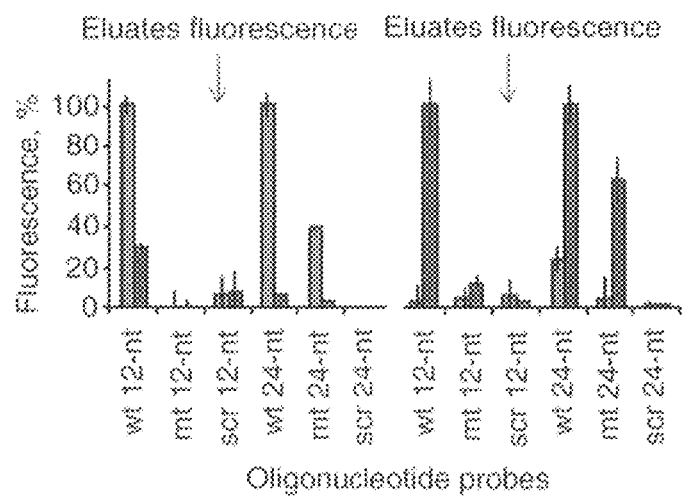

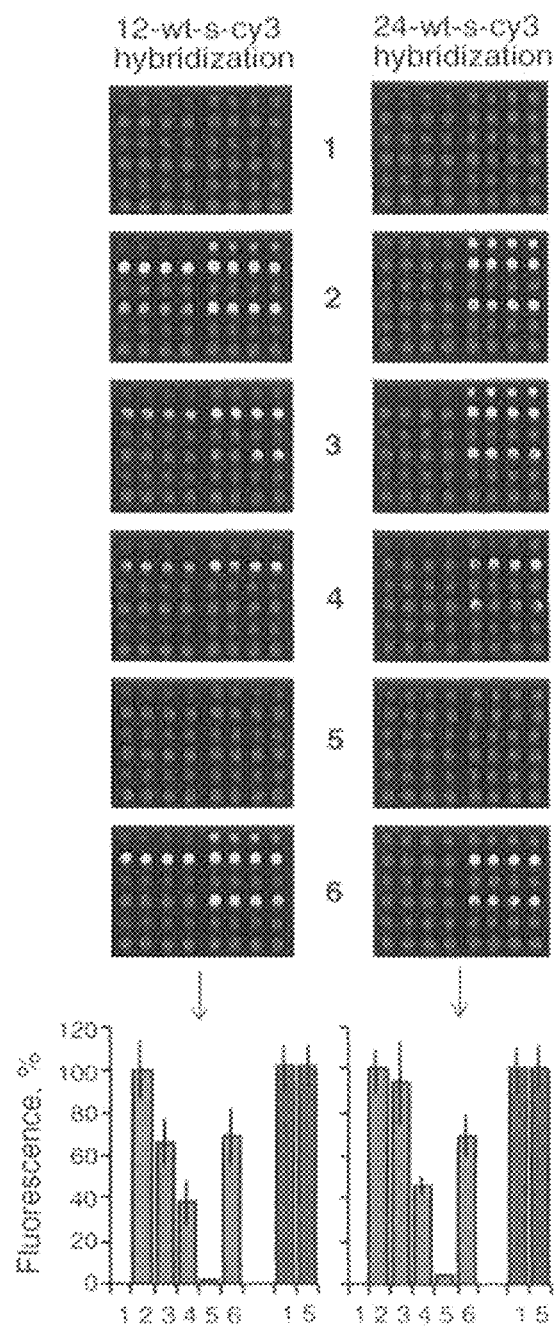

Fig. 8A          Fig. 8B
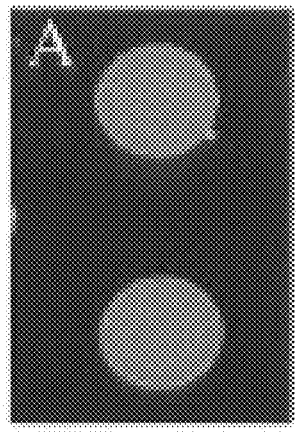 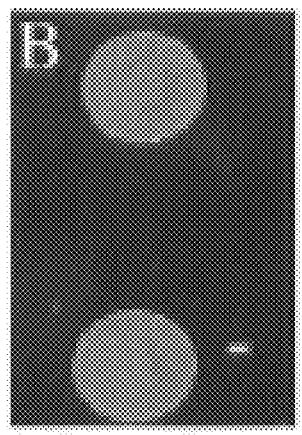
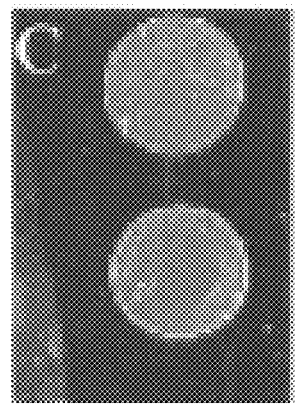 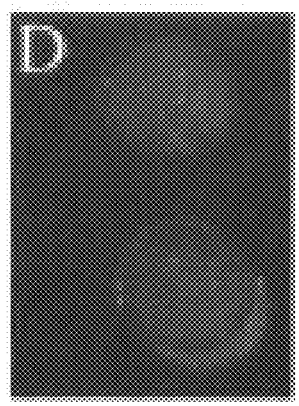
Fig. 8C          Fig. 8D
Fig. 8A-8D

METHODS AND DEVICES BASED UPON A NOVEL FORM OF NUCLEIC ACID DUPLEX ON A SURFACE

CROSS-REFERENCE TO RELATED APPLICATIONS

This application is a divisional application of U.S. Ser. No. 12/080,720, filed Apr. 4, 2008; issued as U.S. Pat. No. 10,272,409 on Apr. 30, 2019; which is a continuation-in-part application that claims benefit of priority under 35 U.S.C. § 120 of nonprovisional U.S. Ser. No. 10/193,938, filed Jul. 11, 2002, issued as U.S. Pat. No. 7,354,710 on Apr. 8, 2008, which claims benefit of priority under 35 U.S.C. § 119(e) of provisional U.S. Ser. No. 60/304,500, filed Jul. 11, 2001.

This Application contains a sequence listing submitted as a text file via EFS Web, herein incorporated by reference.

FEDERAL FUNDING LEGEND

This invention was produced in part using funds obtained through grant P01CA75173 from the National Cancer Institute. Consequently, the federal government has certain rights in this invention.

BACKGROUND OF THE INVENTION

Field of the Invention

The present invention relates to the fields of microarray devices and hybridization technologies. Specifically, the present invention provides hybridization devices having a surface and a saturated film of adsorbed oligonucleotides effective to hybridize to a complementary nucleic acid as a non-helical asymmetrical duplex.

Description of the Related Art

The double helix is known to form as a result of the hybridization of complementary nucleic acid strands in aqueous solution. In the helix, the negatively charged phosphate groups of each nucleic acid strand are distributed helically on the outside of the duplex and there, are available for interaction with cationic groups. Cation-coated solid supports are now widely used in biotechnology, especially for covalent attachment of cDNAs and oligonucleotides as surface-bound probes on microarrays. These cation surfaces can bind the nucleic acid backbone electrostatically through the phosphate moiety. Oligonucleotides of less than 100 nucleotides are better suited for hybridization on such supports than full length genes.

Microarray technology has revolutionized applied genomics (Cheung V G et al., 1999, *Nature Genetics* 21:15-19; Duggan D J et al., 1999, *Nature Genetics* 21:10-14). It is based upon hybridization of a surface-bound nucleic acid to a nucleic acid in solution to form a Watson-Crick double helix by a mixed phase reaction between complementary nucleic acid strands. The secondary structure of the resulting double helix is determined, in part, by base pairing and base stacking, in conjunction with the constraints imposed on phosphodiester backbone conformation and sugar pucker. Those interactions serve to define local base pairing and also the overall pitch of the helix. Although, in solution, the average pitch of the helix is near to 10 base pairs, structural studies have revealed a high degree of variability and flexibility of pitch angle, including the modeling-based prediction that a flat, non-helical ribbon-like structure might form under conditions of extreme mechanical distension (Leger J F et al., 1999, *Phys. Rev. Lett.* 83:1066-1069; Bensimon D et al., 1995, *Phys. Rev. Lett.* 74:4754-4757; Smith S B et al., 1996, *Science* 271:795-799; Lebrun A et al., 1996, *Nucl. Acids Res.* 24:2260-2267; and Marko J F, Feig M, and Pettitt B M *J. Phys. Chem.*, submitted (personal communication)) or upon the disruptive binding of an intercalator (Gao O et al., 1991, *Proc. Natl. Acad. Sci. USA* 88:2422-2426).

Nucleic acids may be covalently or noncovalently immobilized on a surface. Several means of covalent attachment of nucleic acids are known in the art. For example, oligonucleotides may be covalent coupling to a surface by chemical or photochemical crosslinking as commonly practiced following Northern and Southern blotting of nucleic acids onto nylon or nitrocellulose membranes. Covalent attachment also may be achieved using pre-synthesized oligonucleotides that are fabricated with a chemical linker at one or both ends of the oligonucleotide. U.S. Pat. No. 6,048,695 to Bradley and Cai discloses a method wherein a linker is added to an oligonucleotide for the purpose of making a covalent bond with reactive moieties on the surface. See e.g. U.S. Pat. No. 6,048,695 and references therein. Thus, oligonucleotide probe attachment occurs with the surface through the linker, rather than by direct adsorptive interaction of the probe with the surface.

Still another means of covalently attaching nucleic acids to a surface is by photolithography. U.S. Pat. No. 5,959,098 to Goldberg et al. discloses a method of derivatizing a surface to provide photoprotected functional groups. Nucleic acids are synthesized directly on the surface by selectively illuminating surface regions to remove the protecting groups. The deprotected regions are then available for covalent attachment of nucleotide monomers having photoprotected functional groups. Repetition of these steps results in oligonucleotides covalently linked to the surface. Further examples of array fabrication include U.S. Pat. No. 6,221,653 to Caren and Luebke (inkjet printing of the nucleic acid building blocks) and U.S. Pat. No. 6,024,925 (microfluidics robot to prepare sample arrays for analysis in a mass spectrometer).

Methods for noncovalently immobilizing nucleic acids typically require a bridging agent. In some cases that bridging agent is a salt or detergent. For example, U.S. Pat. No. 5,610,287 to Nikiforov and Knapp discloses a noncovalent immobilization method comprising contacting a glass or hydrophilic polystyrene solid support with a combination of a nucleic acid and a cationic bridging agent (sodium chloride or a detergent). See e.g. '287, abstract. The method of attachment is based upon interaction of the detergent flocculent with the surface, rather than direct adsorptive interaction between the oligonucleotide and the surface.

Alternatively, the bridging agent may be a high-affinity interaction pair such as avidin and biotin or digoxigenin and an anti-digoxigenin antibody. For example, a biotinylated nucleic acid may be immobilized on a streptavidin-coated surface. See e.g. Belosludtsev Y et al., 2001, *Biochem Biophys Res Commun.* 282:1263-1267; Holmstrom et al., 1993, *Anal. Biochem.* 209(2):278-283. In this method, a biotin-modified linker is added to an oligonucleotide for the purpose of making a bond with avidin or avidin-like groups coated into the surface. Attachment occurs with the surface through the biotin-modified linker, rather than by direct adsorptive interaction of the probe with the surface.

Methods of adsorptive, non-covalent immobilization of long, single or double stranded DNA molecules onto membrane surfaces are the basis for a device referred to as a "Southern" or "Northern" blot. Standard practice of the blotting technology art has shown that, where probe length is less than about 100 bases, the known adsorptive methods of attachment are too weak to support probe attachment that is sufficiently stable to form a hybridization device. Thus, the standard for attachment of short nucleic acid probes in blotting applications has involved covalently crosslinking the nucleic acid to the solid support (as by photochemical cross linking) or other means of non-adsorptive linkage (such as chemical crosslinking). Known methods to increase the strength of adsorptive, non-covalent immobilization of short nucleic acids to membrane supports have been shown to render the DNA unsuitable for a hybridization device and hence the conventional blotting methods involving short nucleic acid probes all employ a covalent means of immobilization. Other types of porous material, including porous beads and related small particle porous substrates, are known to behave as do membranes, that is, long DNA probes may be attached by adsorptive interaction, but short probes must be attached by non-adsorptive means.

Adsorptive, non-covalent immobilization of long, single or double stranded DNA molecules onto non-membranous surfaces, most particularly the planar substrates (often referred to as slides), may be achieved by known methods and used for the fabrication of DNA microarrays. The adsorptive probe interaction is the basis for fabrication and use of DNA microarrays in which long (greater than 100 bases) nucleic acid probes are spotted into planar surfaces to form the microarray. Standard practice of the microarray fabrication art has shown that long nucleic acid probes may be attached to surfaces by means of adsorptive association with polycation-coated surfaces (usually poly-lysine).

However when short nucleic acids (less than 100 bases) are to be attached to microarray surface, the known adsorptive methods of microarray attachment are found to be too weak to provide for stable probe attachment to form a microarray-based hybridization device. Thus the standard of the art for attachment of oligonucleotide probes (less than 100 bases) in microarray applications has involved covalent attachment of the nucleic acid to the microarray support, generally by covalent linkage of the oligoncucleotide terminus (3' or 5') to the solid support or other means of non-adsorptive interaction. Known methods to increase the strength of adsorptive, non-covalent immobilization of short nucleic acids to microarray supports have been shown to render the DNA unsuitable for these applications. This may be due to a loss of the ability of the oligonucleotide to form a duplex or unsuitably high levels of non-specific target binding to the microarray.

Oligonucleotides (short single stranded pieces of nucleic acid (DNA, RNA) of less than 100 bases in length) are well suited as probes to be attached to a solid support as the basis for a hybridization device. However, no method is presently known to directly adsorb the oligonucleotide onto a solid support by adsorption, in a way that yields a probe that can be used for hybridization. In fact, the literature indicates that direct absorption of oligonucleotides is not expected to work. For example, Lindsay asserts that methods of attaching DNA over about 100 bases in length to mica using aminopropyltriethoxysilane for structural analysis by atomic force microscopy result in DNA that is bound too strongly for studies of processes in situ. See Lindsay S M, The Scanning Probe Microscope in Biology, draft available at green.la.asu.edu/review/chap_7(3-5).htm.

A recent study of adsorbed oligonucleotides at a hydrocarbon coated silica surface concluded that oligonucleotide (<100 bases) adsorption would necessarily prohibit base pair specific hybridization, and thus make the product useless as a hybridization device. See Wirth M J, www.udel.edu/chem/wirth/oligos.html ("Any specific adsorption to sites on the surface interferes with the hybridization process. In practice, surfaces tend to have groups that hydrogen bond to the bases on oligonucleotides. Such hydrogen bonding to the substrate gives background noise that reduces the sensitivity of detecting oligonucleotides.")

Furthermore, Bradley and Cai argue that adsorptive methods to create DNA hybridization devices adversely affect the quality of performance of the device due to the electrostatic charge on the glass surface. See U.S. Pat. No. 6,048,695, col. 1, line 46 to col. 2, line 8.

Thus, several lines of argument in the literature assert a hybridization device based on direct adsorption of oligonucleotide probes to a solid support is not feasible. To the best of the inventors' knowledge, there is no evidence for or discussion of such an oligonucleotide adsorption based hybridization device described in the literature or available commercially. All known oligonucleotide based hybridization devices (including microarrays, membranes, bead supports and all other configurations involving probe attachment to a support) are based on one of the above-described attachment methods.

Thus, there is a recognized need in the art to provide improved, low cost, hybridization devices utilizing direct adsorption of oligonucleotides. More specifically, the prior art is deficient in biomolecular hybridization devices comprising oligonucleotide probes effective to hybridize to a cognate target as a nonhelical, asymmetrical duplex. The present invention fulfills this long-standing need and desire in the art.

SUMMARY OF THE INVENTION

The present invention relates to simple method to fabricate DNA hybridization devices based upon adsorptive rather than covalent attachment of oligonucleotides to a surface. Such adsorbed oligonucleotide probes form a densely packed monolayer, which retains capacity for basepair specific hybridization with a solution state nucleic acid target strand to form the duplex. However, both strand dissociation kinetics and the rate of DNase digestion demonstrate on symmetry grounds that the target nucleic acid binds to such adsorbed oligonucleotides to form a highly asymmetric and unwound duplex. A non-helical nucleic acid duplex may be the preferred structural isomer on a charged surface.

Thus, the present invention is directed to a biomolecular hybridization device. The hybridization device comprises a substrate having a surface of functional groups permanently and covalently attached thereto and an adsorbed monolayer of unmodified, single-stranded oligonucleotides all of which are 10 to about 24 bases in length as a saturated film of constrained oligonucleotides on the surface via direct non-covalent phosphate-surface adsorptive contact of substantially all phosphate groups of each oligonucleotide. In the monolayer each constrained oligonucleotide base plane is presented from the surface in a manner effective to dissociably hybridize to a complementary single-stranded nucleic acid with asymmetric, non-helical base pairing without alteration of the oligonucleotide base plane presentation and without oligonucleotide phosphate group dissociation from the surface. The present invention is directed to a related biomolecular hybridization device that further comprises a non-hybridizing poly-T sequence at one or both of the 5' or 3' end of the oligonucleotides such that the adsorbed oligonucleotides are each about 30 bases in length. The present invention is directed to another related biomolecular hybridization device that further comprises a capping material disposed on the surface. The present invention is directed to yet another biomolecular hybridization device that further comprises a single-stranded nucleic acid reversibly hybridized to the oligonucleotide as a non-helical duplex of 10 to about 24 base pairs long adsorbed to the surface.

The present invention also is directed to a related biomolecular hybridization device. The hybridization device comprises a substrate having a surface of functional groups permanently and covalently attached thereto and an adsorbed monolayer of unmodified, single-stranded oligonucleotides all of which are about 30 bases in length as a saturated film of constrained oligonucleotides on the surface via direct non-covalent phosphate-surface adsorptive contact of substantially all phosphate groups of each oligonucleotide. The constrained oligonucleotides each have a targeted, hybridizing domain of 10 to about 24 bases and a non-targeted, non-hybridizing domain of bases flanking one or both of the 5' or 3' ends thereof. Each constrained oligonucleotide base plane within the targeted domain is presented from the surface in a manner effective to dissociably hybridize to a complementary single-stranded nucleic acid target with asymmetric, non-helical base pairing without alteration of the oligonucleotide base plane presentation and without oligonucleotide phosphate group dissociation from the surface. The present invention is directed to related biomolecular hybridization devices that further comprise the capping material and the single-stranded nucleic acid reversibly hybridized to the oligonucleotide as discussed supra.

The present invention is directed further to another related biomolecular hybridization device. The hybridization device comprises a substrate having an aminosilanized surface permanently and covalently attached thereto and an adsorbed monolayer formed of unmodified single-stranded oligonucleotides all of which are 10 to 24 bases in length adsorbed to the aminosilanized surface as a saturated film of constrained oligonucleotides on the surface via direct non-covalent phosphate-surface adsorptive contact of substantially all phosphate groups of each oligonucleotide at a density of one phosphate group per about 0.5 square nanometers to less than about 1 square nanometer of surface. Each constrained oligonucleotide base plane is presented from the surface in a manner effective to dissociably hybridize to a complementary single-stranded nucleic acid with asymmetric, non-helical base pairing without alteration of the oligonucleotide base plane presentation and without oligonucleotide phosphate group dissociation from the surface. The present invention is directed to related biomolecular hybridization devices that further comprise the 5' and/or 3' non-hybridizing poly-T sequences, the capping material and the single-stranded nucleic acid reversibly hybridized to the oligonucleotide as discussed supra.

The present invention is directed further still to a method for hybridizing solution-state target nucleic acids to probe nucleic acids. The method comprises contacting the biomolecular hybridization devices described supra with at least one solution-state nucleic acid target under conditions that permit hybridization thereto such that non-helical, asymmetrical probe-target duplexes are formed.

The present invention is directed further still to a method for identifying a nucleotide sequence to which a nucleotide-binding protein binds. The method comprises contacting the biomolecular hybridization device comprising the non-helical duplex described supra with a nucleotide-binding protein under conditions that permit binding. The formed duplex-protein complex(es) are eluted from the surface with a salt solution with an ionic strength of an aqueous solution of from about 1 M to about 5 M NaCl. At least one strand of the eluted nucleic acid duplex is sequenced.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others which will become clear are attained and can be understood in detail, more particular descriptions and certain embodiments of the invention briefly summarized above are illustrated in the appended drawings. These drawings form a part of the specification. It is to be noted, however, that the appended drawings illustrate preferred embodiments of the invention and therefore are not to be considered limiting in their scope.

FIG. 1A shows standard curves for a 12-mer (filled squares) and a 24-mer (open squares). Cy5-labeled probes were printed at 10 nl, then imaged without washing on an ArrayWorx imager (Applied Precision, Inc.). The number of probe molecules per array element, x-axis, was calculated from the product of printed volume, probe concentration, and Avogadro's number. The y-axis represents log of the mean integrated value of Cy5 dye fluorescent signal from the array elements. Each data point represents the mean and a single standard deviation from the mean calculated from 56 array elements. FIG. 1B shows the surface area per oligonucleotide, occupied by a 12-mer (filled circles) or a 24-mer (open circles). Cy5-labeled oligonucleotide probe was printed in 70% DMSO/30% $H_2O$ at 10 nl per array element, as a function of concentration on the aminosilanized glass surface, followed by washing to remove unbound probe. The y axis was calculated by dividing the measured array element surface area by the number of adsorbed probe molecules per array element (calculated from standard curves in FIG. 1A). Each data point represents the mean and a single standard deviation from the mean calculated from 56 array elements.

FIGS. 2A-2C illustrate the fabrication of the arrays and specific hybridization. FIG. 2A is a prototype of the layout of a microarray of the invention. FIG. 2B shows the hybridization of a 12-mer Cy3-labeled target to the array shown in FIG. 2A. A 10 minute hybridization at 5 µM and at room temperature was followed by a 1 min wash at room temperature in 60 mM Na+ carbonate, 20% formamide, 0.6% polyvinyl alcohol, 5×Denhardts, pH=9.5. FIG. 2C shows the hybridization of a 24-mer Cy3-labeled target to the array shown in FIG. 2A. A 10 minute hybridization at 3 µM and at room temperature was followed by a 1 min wash at room temperature in 60 mM Na+ carbonate, 35% formamide, 0.6% polyvinyl alcohol, 5×Denhardts, pH=9.5. Hybridization conditions are described in materials and methods. Probe and target sequences are described in Table 1. Cy3 signal is green and Cy5 signal is red.

FIGS. 3A-3D illustrate models of duplex formation on a cationic surface of the invention. FIG. 3A shows a single-stranded, 24-mer oligonucleotide probe electrostatically attached to an aminosilanized surface. FIG. 3B shows a linear, non-helical DNA ribbon duplex on a cationic surface of the invention, formed along its full length between an extended 24-mer probe and its 24-mer complementary target. FIG. 3C shows a 24 base pair long B-form DNA double helix on a cationic surface of the invention. FIG. 3D shows the chemical structure of a 3-aminopropyltrimethoxysilanized glass surface of the invention. The models in FIGS. 3A-3C were generated in the Molecular Builder module of InsightII and energy minimizations for ribbon duplex structure were done with the Amber force field of Discover 3 package (MSI). Although it is quite possible that most common isomers of single-stranded (FIG. 3A) and double-stranded (FIG. 3B) DNA may have some curvature on a positively charged surface, only the linear isomers are shown for simplicity.

FIGS. 4A-4B illustrate dissociation kinetics to analyze strand asymmetry within the surface-bound duplex. FIG. 4A shows wild type sense 12-mer targets labeled with Cy3 dye hybridized to the arrays described in FIG. 2. FIG. 4B shows wild type sense 24-mer targets labeled with Cy3 dye hybridized to the arrays described in FIGS. 2A-2C. The kinetics of target dissociation during washing: (1) no hybridization, (2) after hybridization and no dissociation, (3) after hybridization and dissociation for 1 min, (4) after hybridization and dissociation for 4 min, (5) after hybridization and dissociation for 16 min, (6) after hybridization and dissociation for 16 min, followed by a second hybridization step. The bar graphs represent the normalized means and the standard deviations of the mean from eight array elements.

FIGS. 5A-5B are an analysis of the washing eluate. In FIG. 5A patches of aminosilanized surface (3 mm² each) were saturated with Cy5-labeled probes (red), followed by rinsing to remove the excess probes as described in materials and methods. Cy3-labeled targets (green) were hybridized to these patches, rinsed to remove the unbound targets, and washed in 2 µM of the washing buffer for 15 min (see materials and methods). A 0.2 µl aliquot was aspirated from the resulting washing buffer and spotted on a clean slide, which was subsequently imaged with Cy3 and Cy5 filter sets on the ArrayWorx Imager (Applied Precision). In FIG. 5B the reverse experiments are also shown where the targets and the probes have been reversed. The bar graphs represent the normalized means and the standard deviations of the mean from four such 0.2 µl eluates.

FIGS. 6A-6B are DNase protection assays according to Example 6. In FIG. 6A wild-type, sense, Cy3 dye labeled 12-mer targets hybridized to the arrays described in FIGS. 2A-2C. In FIG. 6B wild-type, sense, Cy3 dye labeled 24-mer targets hybridized to the arrays described in FIG. 2. (1) No hybridization, (2) after hybridization and incubation with 0 u/µl of DNase I in DNase buffer, (3) after hybridization and incubation with 0.1 u/µl of DNase I, (4) after hybridization and incubation with 1.0 u/µl of DNase I, (5) after hybridization and incubation with 10.0 u/µl of DNase I, (6) after hybridization, incubation with 10.0 u/µl of DNase I, prehybridization and second hybridization. The bar graphs represent the normalized means and the standard deviations of the mean from 8 array elements. Cy3 signal is green and Cy5 signal is red.

FIGS. 8A-8D illustrate the stability of adsorbed DNA. Cy3-labeled DNA 50-mer directly adsorbed onto a cationic surface using vapor deposition (Example 1) was washed for 5 minutes (FIG. 8A) or 24 hours (FIG. 8B). Numerical intensities are shown in Table 2. Cy3-labeled DNA 50-mer directly adsorbed onto a cationic surface according to the solution-dipped method of CeI Associates (CSA-25; www.cel-1.com/) was washed for 5 minutes (FIG. 8C) or 24 hours (FIG. 8D).

FIGS. 11A-11B are standard sequencing profiles for variants 2-3 and variants 3 and 7, respectively. FIGS. 11C-11D are the corresponding microarray hybridization data for these variants. In FIG. 11E a number of DNA samples corresponding to known DNA sequence variants were subjected to HLA-B specific PCR and microarray data. The two-domain 30mer hybridization probes generate sequence selective microarray hybridization data which can be used to confirm nucleotide sequence changes in the corresponding HLA-B region of the human genome.

DETAILED DESCRIPTION OF THE INVENTION

Figure 1A:
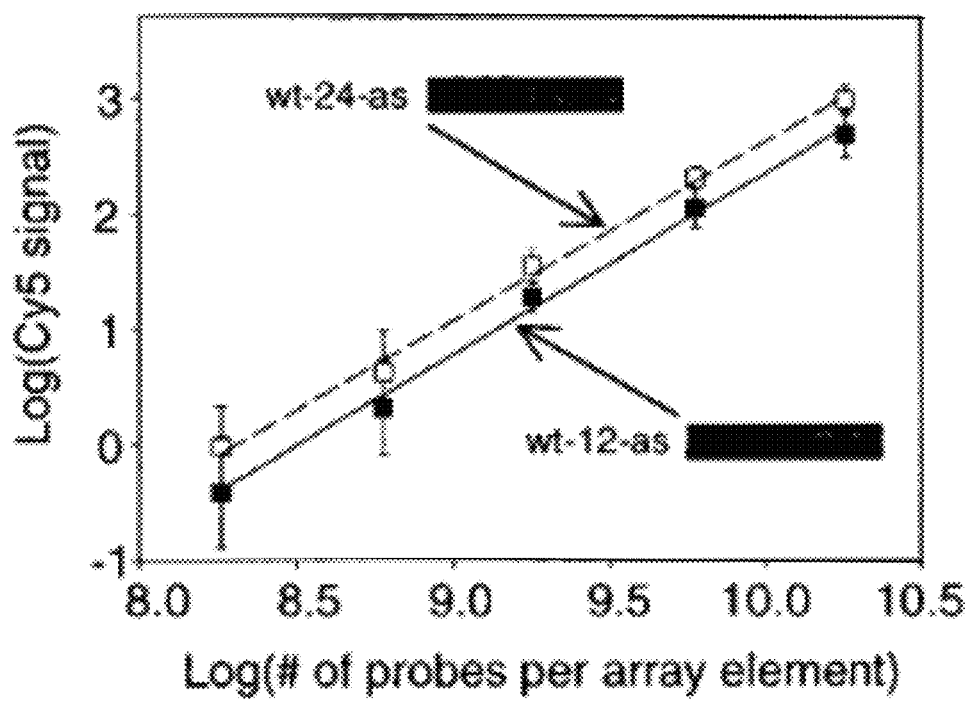
FIGS. 1A-1B illustrate the noncovalent adsorption of DNA oligonucleotides on a positively charged surface.

As used herein, the term "a" or "an", when used in conjunction with the term "comprising" in the claims and/or the specification, may refer to "one," but it is also consistent with the meaning of "one or more," "at least one," and "one or more than one." Some embodiments of the invention may consist of or consist essentially of one or more elements, method steps, and/or methods of the invention. It is contemplated that any method or composition described herein can be implemented with respect to any other method or composition described herein.

As used herein, the term "or" in the claims refers to "and/or" unless explicitly indicated to refer to alternatives only or the alternatives are mutually exclusive, although the disclosure supports a definition that refers to only alternatives and "and/or."

As used herein, the term "adsorb", "adsorption", and grammatical equivalents thereof refer to a noncovalent interaction between a surface and a biomolecule. In preferred embodiments of the invention, the biomolecule is a nucleic acid. In other embodiments of the invention, the biomolecule may be or may comprise one or more amino acids, lipids, and/or carbohydrates. The interaction may be based on electrostatic attraction, hydrogen bonding, Van der Waals interactions, and/or hydrophobic interactions. In presently preferred embodiments, the interaction is based, at least in part, on the electrostatic attraction between the phosphate background and a surface having cationic functional groups.

As used herein, the phrase "functional group" refers to the atom(s) responsible for the characteristic reactions of a compound. For example, the functional group of alcohols is —OH, the functional group of aldehydes is —CHO, the functional group of carboxylic acids is —COOH. A given functional group behaves in approximately the same way in all molecules of which it is a part. A single molecule may have a plurality of functional groups. Functional groups of the invention mediate mediate a noncovalent interaction between a surface and nucleic acid As used herein, the term "probe" refers to a nucleic acid, typically single stranded, that is adsorbed to a surface. Probes of the invention may have a length of from about 1 nucleotide to about 100 nucleotides, preferably from about 12 nucleotides to about 60 nucleotides. A nonlimiting model of adsorbed probe structure is that of a nonhelical structure having substantially all backbone phosphate groups contacting the surface.

As used herein, the term "target" refers to a nucleic acid that is either in solution state or hybridized to a probe molecule. Targets of the invention may be single or double stranded and may comprise DNA, RNA or both. In some embodiments of the invention targets may have a length of from about 1 nucleotide to about 100 nucleotides, preferably from about 12 nucleotides to about 60 nucleotides. In some embodiments of the invention, target may have a length of from about 100 nucleotides to full-length cDNAs or mRNAs, preferably mouse or human. A nonlimiting model of a hybridized probe-target structure is that of a nonhelical duplex with a helical pitch angle near zero with at least about 9 of every 10 nucleotides base-paired.

As used herein, the term "substrate" refers to any material intrinsically having a surface of the invention. It also refers to any material that may be modified to create a surface of the invention. Substrates may be glass, ceramic, metallic, organic, inorganic or combinations thereof. Substrates may have the form of a slide, a bead or any other form known in the art.

As used herein, the term "surface" refers to a covalently-contiguous geometrical domain or a region of a geometrical domain directly contactable by surrounding media and having functional groups that support adsorption of nucleic acids through electrostatic interactions, hydrogen bonding, Van der Waals interactions, London interactions, hydrophobic interactions or combinations thereof. In some embodiments of the invention, a zwitter ionic surface may be used to support biomolecular adsorption. A surface of the invention may be fabricated on a substrate or may be an intrinsic property of the substrate. A nonlimiting example of surface fabrication is aminosilanization of a glass substrate wherein cationic functional groups are covalently linked to the substrate. In some embodiments, a device of the invention is a microarray wherein each spot is a surface as described here.

In one embodiment of the present invention there is provided biomolecular hybridization device comprising a substrate having a surface of functional groups permanently and covalently attached thereto; and an adsorbed monolayer of unmodified, single-stranded oligonucleotides all of which are 10 to about 24 bases in length as a saturated film of constrained oligonucleotides on the surface via direct non-covalent phosphate-surface adsorptive contact of substantially all phosphate groups of each oligonucleotide; wherein each constrained oligonucleotide base plane is presented from the surface in a manner effective to dissociably hybridize to a complementary single-stranded nucleic acid with asymmetric, non-helical base pairing without alteration of the oligonucleotide base plane presentation and without oligonucleotide phosphate group dissociation from the surface.

Further to this embodiment the biomoleculary hybridization device may comprise a non-hybridizing poly-T sequence at one or both of the 5' or 3' end of the oligonucleotides such that the adsorbed oligonucleotides are each about 30 bases in length. In another further embodiment the biomolecular hybridization device may comprise a capping material disposed on the surface. Examples of a capping material are a surfactant or an acid anhydride. In yet another further embodiment the biomolecular hybridization device may comprise a single-stranded nucleic acid reversibly hybridized to the oligonucleotide as a non-helical duplex of 10 to about 24 base pairs long adsorbed to the surface. Examples of a nucleic acid are DNA or RNA.

In all embodiments the phosphate groups may adsorb to the surface at a density of one phosphate group per about 0.5 square nanometers to less than about 1 square nanometer of surface. In addition, the form of the substrate may be a slide or a bead.

Also, in all embodiments the functional groups may form wherein the functional groups form a positively charged, polar or negatively charged hydrophilic surface or form a hydrophobic surface. An example of a positively charged surface is an aminosilane. In addition, the surface may comprise an organic material or an inorganic material. Examples of an organic material are amino acids, lipids, nucleotides, carbohydrates, hydrocarbons, or isoprenoids. An example of an inorganic material is a hydrogen bond donor metal oxide. Particularly, the metal oxide is ferrite, aluminum dioxide or titanium dioxide or ferrite coated with an oxide of aluminum, titanium, zirconium, barium, calcium, cadmium, cobalt, iron, magnesium, nickel, or zinc.

In a related embodiment of the present invention there is provided a biomolecular hybridization device comprising a substrate having a surface of functional groups permanently and covalently attached thereto; and an adsorbed monolayer of unmodified, single-stranded oligonucleotides all of which are about 30 bases in length as a saturated film of constrained oligonucleotides on the surface via direct non-covalent phosphate-surface adsorptive contact of substantially all phosphate groups of each oligonucleotide; where the constrained oligonucleotides each have a targeted, hybridizing domain of 10 to about 24 bases and a non-targeted, non-hybridizing domain of bases flanking one or both of the 5' or 3' ends thereof such that each constrained oligonucleotide base plane within the targeted domain is presented from the surface in a manner effective to dissociably hybridize to a complementary single-stranded nucleic acid target with asymmetric, non-helical base pairing without alteration of the oligonucleotide base plane presentation and without oligonucleotide phosphate group dissociation from the surface. In further embodiments the biomolecular hybridization device may comprise the capping material and the single-stranded nucleic acid reversibly hybridized to the oligonucleotide as a non-helical duplex as described supra.

In all embodiments the the non-targeted, non-hybridizing domain bases may be a poly-T sequence or other inert sequence of bases. Also, the saturating amount that forms the adsorbed monolayer, the density of the adsorbed oligonucleotides, the functional groups comprising the surface, and the form of the substrate are as described supra.

In another related embodiment of the present invention there is provided a biomolecular hybridization device comprising a substrate having an aminosilanized surface permanently and covalently attached thereto; and an adsorbed monolayer of unmodified single-stranded oligonucleotides all of which are 10 to 24 bases in length adsorbed to the aminosilanized surface as a saturated film of constrained oligonucleotides on the surface via direct non-covalent phosphate-surface adsorptive contact of substantially all phosphate groups of each oligonucleotide at a density of one phosphate group per about 0.5 square nanometers to less than about 1 square nanometer of surface, wherein each constrained oligonucleotide base plane is presented from the surface in a manner effective to dissociably hybridize to a complementary single-stranded nucleic acid with asymmetric, non-helical base pairing without alteration of the oligonucleotide base plane presentation and without oligonucleotide phosphate group dissociation from the surface.

In further embodiments the biomolecular hybridization device may comprise the 5' and/or 3' non-hybridizing poly-T sequences, the capping material and the single-stranded nucleic acid reversibly hybridized to the oligonucleotide as a non-helical duplex as described supra. Also, in all embodiments the form of the substrate is as described supra.

In another embodiment of the present invention there is provided a method for hybridizing solution-state target nucleic acids to probe nucleic acids comprising contacting the biomolecular hybridization devices described supra with at least one solution-state nucleic acid target under conditions that permit hybridization thereto such that non-helical, asymmetrical probe-target duplexes are formed.

In yet another embodiment of the present invention there is provided a method for identifying a nucleotide sequence to which a nucleotide-binding protein binds comprising contacting the biomolecular hybridization device comprising the non-helical duplex described supra with a nucleotide-binding protein under conditions that permit binding; eluting formed duplex-protein complex(es) from the surface with a salt solution with an ionic strength of an aqueous solution of from about 1 M to about 5 M NaCl; and sequencing at least one strand of the eluted nucleic acid duplex.

The present invention provides devices and methods for detecting solution-state target nucleic acids or solution-state small molecule analytes. Devices of the invention are biomolecular hybridization devices and comprise a substrate with a surface and an oligonucleotide or nucleic acid adsorbed to the surface. The substrate itself may be an adsorptive surface, e.g., glass, plastic, metal, ceramic, or a woven textile or paper. The substrate may be planar or nonplanar. Pores may be introduced into the substrate as a polymer network, a network of ceramic pores, or by etching of an otherwise-smooth glass, plastic, metal or ceramic surface. The form of device may be a slide, a microbead, a microarray, an electrode or an integrated circuit.

In those instances where the substrate surface cannot engage in direct bonding with the phosphate backbone, the substrate is coated with an appropriate surface film, allowing for the desired adsorptive association. The substrate may have an adsorptive surface comprising functional groups permanently and covalently attached thereto may be uniform and dense with respect to the functional groups that mediate nucleic acid binding, e.g., polar, uncharged groups, charged groups, hydrophobic groups, and combinations thereof. The functional group uniformity and density is a critical feature. The functional group may be cationic with a density of about 1 group per 5 Å on center. Particularly, desired functional groups are covalently attached to a substrate to form a surface. Also, functional groups may be attached to the substrate by vapor deposition. A nonlimiting illustrative comparison between the preferred method of vapor deposition of functional groups relative to a prior art solution-dipped method appears in Example 13 and FIG. 8.

The adsorptive surface may be saturated with the oligonucleotide forming a monolayer to maximize probe retention. This may be accomplished by applying about two fold more probe to the surface than required. In a nonlimiting example, a probe concentration of 10 µM is used where a titration curve (such as displayed in FIG. 1) indicates that the amount that probe required for saturation is 5 µM. Capping residual surface charges following probe adsorption is essential. The invention contemplates the use of any means of capping known in the art. In some embodiments chemical capping may be used. For example capping may be achieved with a surfactant, e.g. SDS, or with an acid anhydride, e.g., succinic anhydride.

The present invention provides a method for adsorbing a nucleic acid onto a surface. The surface is contacted with a saturating amount of oligonucleotide or nucleic acid under conditions that permit adsorption and capping residual nucleic acid binding sites. The surface has uniformly distributed functional groups that support adsorption. In addition, the method further comprises covalently modifying the surface with the desired functional groups described herein.

The adsorptive surfaces are effective to adsorb nucleic acids thereto via phosphate bonding to the functional groups comprising the surface. The adsorptive force by which the oligonucleotide probe is bound to the surface may be hydrogen bonding, electrostatic interactions, Van der Waals interactions, hydrophobic interactions, or combinations thereof. Devices of the invention do not require any intervening or bridging biomolecule between the surface and the oligonucleotide.

Device surfaces may be hydrophobic or hydrophilic. Hydrophilic device surfaces may be uncharged (polar), negatively charged, or positively charged. For example, surfaces may comprise a primary amine, a secondary alkyl amine, a tertiary alkyl amine, a guanidinium group, an amidinium group, an imidazolium group, an uncharged organic H-bond donor such as an aldehyde, alcohol or fomamide, an uncharged inorganic H-bond donor such as metal or metalloid oxides or others, or combinations thereof.

The adsorbed oligonucleotides may comprise about 10 to about 100 bases, preferably, about 10 to about 60 bases and more preferably, about 10 to about 24 bases. The adsorbed oligonucleotides are targeted by and are hybridized to a single-stranded complementary nucleic acid or cognate ligand, such as DNA or RNA. Also, the oligonucleotide may comprise a non-targeted, non-hybridizing base sequence flanking one or both of the 5' or 3' ends thereof such that the number of bases in the adsorbed oligonucleotide is about 30. In this instance the adsorbed oligonucleotide comprises a targeted domain of 10 to about 24 bases and one or two flanking domains that cannot hybridize to a target nucleic acid, but provide adsorptive stability to the adsorbed oligonucleotide. The flanking domains may comprise a poly-Thymine (poly-T) sequence or other inert sequence of bases.

The present invention also provides a device and method to detect solution state nucleic acid analytes, namely a device comprising the oligonucleotide or nucleic acid probes described herein that are bound by adsorptive association to the device surface. After adsorptive association to the surface, the bound probe (now on the device surface) is capable of hybridizing to a solution-state nucleic acid target, e.g., DNA or RNA, thereby forming a probe-target duplex. Such hybridizing may be detected by standard methods including fluorescence, optical, radiometric or potentiometric analysis.

In addition, the method for forming the novel duplex is shown to be of immediate practical utility, in that it can be implemented at approximately 1/10 the cost of fabrication relative to current alternatives. Hybridization signals are found to be high, due to the dense packing of surface bound probe and selectivity is measured to be at or near the limit already known for hybridization based upon Watson-Crick double helix formation.

Thus, the present invention also provides a novel composition of matter, namely a new stable form of a nucleic acid duplex. The data presented here demonstrate that single-stranded DNA can bind tightly to a positively charged, aminosilanized glass surface to form a densely packed nucleic acid monolayer. Upon sequence-selective hybridization of such adsorbed probes to their antiparallel Watson-Crick complement, a duplex is formed with distinctly asymmetric properties that appear hard to reconcile with the known helical DNA structures, such as A, B, or Z double helix. Throughout the instant application, the term "duplex", unless otherwise indicated, refers to this nucleic acid form which is characterized by a reduction of helical pitch angle to a value near to zero. This new form is created by adsorptive binding to a surface of the phosphate backbone of a DNA or RNA single strand "probe", greater than 10 bases in length, followed by Watson-Crick base pairing (A-T, C-G) of a cognate RNA or DNA strand "target" to form the unwound, surface-bound probe-target duplex.

Although unexpected in a simple, mixed phase hybridization experiment as presented here, it is interesting to note that unwound ribbon-like duplexes have been proposed to exist transiently in other somewhat more extreme contexts. For instance, the DNA complex formed upon binding of intercalators such as ditercalinium, as revealed by X-ray crystallography (Gao O et al., 1991, *Proc. Natl. Acad. Sci. USA* 88:2422-2426), involves a nearly complete loss of helical winding. Similarly, an unwound and significantly extended double helix has been proposed to form in solution as a response to the mechanical stress induced by stretching (Leger J F et al., 1999, *Phys. Rev. Lett.* 83:1066-1069; Bensimon D et al., 1995, *Phys. Rev. Lett.* 74:4754-4757; Smith S B et al., 1996, *Science* 271:795-799; Lebrun A et al., 1996, *Nucl. Acids Res.* 24:2260-2267). Within the context of an antiparallel double helix, it is well known that base stacking and helix twist are coupled mechanically. In the studies described previously, either a chemical force (insertion of a heterocycle between base planes) or mechanical strain upon the duplex (stretching) is coupled to an increase of base pair separation and a resultant loss of helical twist.

The experimental data described herein do not measure base pair separation directly. However, as previously predicted from modeling studies, these inventors have found it difficult to generate adsorbed linear, ribbon-like duplexes that do not involve at least a 50% increase in duplex length relative to the B-helix (FIG. 3B). Thus, it is interesting to consider that the ribbon-like duplex, which has been inferred from studies described here, may have necessarily incurred a significant loss of base stacking due to stretching. It is well known that the energetics of duplex formation is mainly determined by base stacking interactions and electrostatic repulsion among phosphates (Dickerson R E, 1992, *Methods Enzymol.* 211:67-111; McConnell K J et al., 2000, *J. Mol. Biol.* 304:803-820).

The findings illustrated in the Examples suggest that due to the direct and indirect consequences of duplex adsorption upon a plane, both the structure and the energetics of ribbon-like duplex formation differ from that known in dilute aqueous solution. The practical applications of such structural and energetic differences are significant.

For example, the novel duplex form mimics a transition state. The binding of drugs and proteins to the double helix often is associated with transient formation of an extended, unwound form of the double helix. The data presented here show that in most respects, the novel helix form described here mimics such a transition state. Potent drugs have been developed based upon their ability to bind to the transition state of the substrate-enzyme complex (so-called transition state analogues). By analogy, the use of the novel duplex form described here (in the context of appropriate devices and methods) allows such DNA transition state analogues to be discovered as pharmaceutical lead compounds.

Also, the novel duplex form has enhanced H-bonding selectivity. The data presented show that base pairing selectivity in the novel duplex form meets or exceeds that seen in the standard Watson-Crick duplex. Molecular modeling of the novel duplex form suggests that base stacking (which is not very sequence dependent) is greatly reduced in magnitude relative to the energy of H-bonding (which is the basis for nucleic acid sequence selectivity). Thus, both modeling and experiment suggest that methods and devices based upon the novel, untwisted duplex will display more precise base sequence recognition than can be attained with the double helix.

In addition, close proximity to the surface allows for modulation of hybridization. The formation of the novel untwisted duplex form is driven by the symmetry constraints associated with surface adsorption. Thus, at its core, the novel duplex form is a molecular entity with structure and energetics that are intimately coupled to the physical chemistry of the surface. As illustrated in the Examples, when the surface is cationic, the electrostatic component of the duplex-surface interaction can eliminate the ordinary requirement for cations in the hybridization solution. This observation reduces to practice the concept that the ionic dependence, temperature dependence and selectivity of hybridization to form the novel duplex can be modified greatly by judicious surface modification.

Furthermore, both cationic and non-cationic surfaces will support the novel duplex form. In the data presented, substrate surfaces were primary amine coated glass, e.g., an aminosilane, or metal oxide coated surfaces. Thus, nucleic acid probe adsorption to the substrate is based upon a combination of electrostatic and H-bonding interaction between the amino groups and the phosphate backbone. Experimental data and modeling suggest that the novel helix form requires stable adsorption mediated through the phosphate. Electrostatic interaction between the negatively charged phosphate and the underlying surface should be sufficient to achieve stable adsorption of that kind. Thus, charged surface coatings of all kinds, for example, but not limited to, primary, secondary, tertiary amines, aminosilanes, amidinium and guanidinium groups, and metal ions, may support the novel surface form.

Alternatively, since phosphate is also an excellent H-bond acceptor, neutral H-bond donating surfaces also are capable of supporting formation of the novel helix form. This includes, inter alia, hydroxyl, amide, urea and other good metallic H-bond donors such as metal or metalloid oxides, e.g., aluminum dioxide ($AlO_2$), titanium dioxide ($TiO_2$) and silicon dioxide ($SiO_2$), or ferrites or compounds, such as clays or ferrites, surface-coated with metal oxides, e.g., aluminum dioxide ($AlO_2$), titanium dioxide ($TiO_2$), zirconium dioxide ($ZrO_2$), barium oxide (BaO), calcium oxide (CaO), cadmium oxide (CdO), cobalt oxide (CoO), ferrous oxide (FeO), magnesium oxide (MgO), nickel oxide (NiO), and zinc oxide (ZnO).

A nucleic acid duplex of the invention has structural characteristics, which differ greatly from a standard nucleic acid helix: namely it is greatly untwisted, with an increase of the separation between adjacent base pairs. Thus, compounds capable of binding double helical forms of nucleic acids may display a different affinity for binding or hybridizing nucleic acid duplexes of the invention. In particular, dyes and haptins which are capable of intercalating into standard double helical nucleic acid forms may bind to an extended, unwound duplex of the invention with higher affinity than to the double helix. Such compounds could be used to distinguish surface-bound duplex, from a standard double helix which might form in solution as a side reaction during hybridization analysis.

Thus, the present invention provides methods for detecting and for screening small molecule analytes, based upon their affinity for associating with a probe-target duplex. This may be accomplished by (i) preparing a device comprising an oligonucleotide or nucleic acid probe that is bound by adsorptive association to the device surface as described herein, (ii) contacting the device with a target nucleic acid under conditions which permit formation of the duplex, (iii) exposing the device to a solution of small molecule analytes, and (iv) detecting and/or collecting one or more analytes based on the affinity with which they bind the duplex.

The invention also relates to the small molecule analytes discovered in such a screen and their uses. For example, small molecules that bind to the duplex may be used (i) for optical detection of duplex formation as in devices of the invention, (2) as leads for subsequent pharmaceutical development or (3) as pharmaceuticals.

Thus, the invention provides a method for identifying the nucleotide sequence to which a nucleotide binding protein, e.g. a transcription factor, binds comprising contacting a microarray having surface-bound probe-target duplexes with a nucleotide binding protein under conditions that permit binding of at least one duplex to said protein, eluting duplex-protein complexes from the surface, e.g., with a concentrated salt solution), and sequencing at least one strand of the duplex.

It can be seen that the methods and devices of the invention provide several advantages over prior art methods and device. For example, the methods and devices of the invention do not require nucleic acid derivitization with a linker thereby eliminating the inefficiencies and costs associated with such a step. Possible inefficiencies of existing methods include incomplete derivitization of the nucleic acid with the linker, biased derivitization of some nucleotide sequences over others, incomplete association of the linker to the surface, and necessary additional manufacturing step(s). A further advantage over the covalent methods of attachment is the reversibility of the probe-surface bond.

The following examples are given for the purpose of illustrating various embodiments of the invention and are not meant to limit the present invention in any fashion.

Example 1

Aminosilanization of a Glass Surface

Glass, pre-cleaned, micro slides (Gold Seal, Gold Seal Products) were cleaned in deionized water, followed by rinsing in HPLC-grade methanol and dried in dust-free oven at 45 C. The slides were transferred to a vacuum oven at 82 C, equilibrated against 3-aminopropyltrimethoxysilane (Aldrich) in 1:2 proportion to p-xylene (Aldrich). The slides were then incubated overnight at 27 mm Hg, followed by storage at room temperature under dust free conditions.

Example 2

Fabrication of Arrays

All oligodeoxyribonucleotides were synthesized, labeled with Cy3 or Cy5 fluorescent dyes at the 5'-ends, and HPLC purified by BioSource International (Camarillo, Calif.). A Microlab 4200 robot (Hamilton) with 10 µl syringes was used to print 6×8 arrays on aminosilanized glass slides: 10 nl volume per array element, 500 µm diameter, 900 µm center to center. Oligodeoxyribonucleotides were printed from 384 well plates (NUNC) at the desired concentration in 70% DMSO (Aldrich)/30% $H_2O$. DMSO inclusion in the printing solution slowed the process of drying and therefore resulted in more uniform probe density within the array elements as compared to printing the probes in water. After printing, arrays were washed in 10 mM NaOH, 100 mM Na+ carbonate, 2% polyvinyl alcohol, 5×Denhardts for 1 min, then rinsed multiple times in deionized $H_2O$, and dried for storage. All procedures were performed at room temperature.

Example 3

Hybridization and Imaging

Hybridization was carried out in the following hybridization buffers: 90 mM Na+ carbonate, 5×Denhardts, pH=9.5 for 12-mer targets and 60 mM Na+ carbonate, 5×Denhardts, 20% formamide, 0.6% polyvinyl alcohol, pH=9.5 for 24-mer targets. The pH has been held at 9.5 throughout in order to reduce surface charge due to free amino groups. Before hybridization, the arrays were pretreated in corresponding hybridization buffers without the targets, containing 1.5% (w/v) polyvinyl alcohol (Aldrich), used as a blocking agent. All steps were done at room temperature. After 10 minutes of hybridization, the slides were washed in corresponding hybridization buffers, rinsed several times in deionized water, dried, and imaged.

The arrays were imaged on a CCD based Arrayworx Imager (Applied Precision, Inc.) with 10 µm resolution. Cy3 and Cy5 optical filters were used during the imaging of the arrays. Exposure times were held at 0.2 sec for Cy3 channel and 1 sec for Cy5 channel, in order to normalize sensitivity. The analysis of intensities from Cy3 and Cy5 channels was done in ArrayWoRx Version 1.50 software (Applied Precision, Inc.) from the original stitched images and the bar graphs were generated in Microsoft Excel. The pictures of the representative arrays were modified by adjusting the levels in Adobe Photoshop 5.5 for presentation purposes only, and the level adjustments did not have any effect on conclusions, since the quantification was done based on the original images.

Example 4

Calculation of Target to Probe Ratio

For these experiments, it was important to have a high target to probe ratio, therefore 12-mer targets were hybridized at 5 µM concentration, and 24-mer targets were hybridized at 3 µM concentration, unless stated otherwise. Time course and concentration dependence experiments have revealed that at such concentrations of the targets their signal was saturated on specific probes after 5 minutes of hybridization. The target to probe ratio has been measured based on calculation of the number of molecules from the analysis of Cy5 signals before hybridization for probes, Cy3 signals after hybridization for targets, and standard curves for Cy3- and Cy5-labeled oligodeoxyribonucleotides (FIG. 1A).

The standard curve for Cy5-wt-24-as (n=56) was fit by a linear regression (log(Cy5 signal)=yo+a*log(number of molecules)) in Sigma Plot 2000. The number of molecules was found from the known volume (10 nl per array element) and concentration of oligodeoxyribonucleotide in printed solution per array element. The standard curves for Cy3-wt-24-s (n=56) and Cy3-wt-12-s (n=56) were fit by a linear regression (log(Cy3 signal)=yo+a*log(number of molecules)) in Sigma Plot 2000. The regression curve for Cy5-wt-24-as probe had values yo=−13.1, a=1.58, R=0.999, where R is the regression coefficient of the mean. The regression curves for the targets Cy3-wt-24-s and Cy3-wt-12-s had values yo=−9.69, a=1.29, R=0.997 and yo-13.7, a=1.64, R=0.999, respectively. The average background subtracted Cy5 signal of Cy5-wt-24-as probe before hybridization was 332.

Thus the number of Cy5-wt-24-as probe molecules per array element could be calculated from its regression equation: (probe number of molecules)=10^[(log(Cy5 signal)−yo)/a]=10^[(log(332)+13.1)/1.58]=7.7*10^9. In the same way, the number of target molecules after hybridization was found to be 3.8*10^9 for Cy3-wt-24-s and 7.8*10^9 for Cy3-wt-12-s. Thus the target to probe ratio was 0.5 and 1 for 24 and 12 bases long targets hybridization to 24 bases long probes, respectively. The concentration of 24 bases long targets was not increased above 3 µM, because that would lead to dramatic increase in background. The fact that 5 µM concentration could be used for 12 bases long targets could be explained by the fact that longer nucleic acids have more negative charge and therefore are attracted stronger to a positively charged surface. The ability of the adsorbed onto the positively charge surface oligodeoxyribonucleotide probes to specifically hybridize to nucleic acid targets with target to probe ratio approaching 1 has been shown previously by radioactive labeling of the targets (Belosludtsev Y Y et al., 2001, *Anal. Biochem.* 292:250-256).

Example 5

Dissociation Experiments

After hybridization, the slides were washed 5 times in the corresponding hybridization buffer containing 1.5% (w/v) polyvinyl alcohol. They were then incubated for various times at room temperature in the wash buffer containing 60 mM Na+ carbonate, 20% formamide for 12-mers and 35% formamide for 24-mers, 5×Denhardts, 0.6% polyvinyl alcohol, pH=9.5.

Example 6

DNase Protection Assays

After hybridization, the slides were washed two times in corresponding hybridization buffer containing 1.5% (w/v) polyvinyl alcohol, followed by brief application of the DNase I digestion buffer containing 50 mM KCl, 10 mM $MgCl_2$, 20 mM Tris-HCl, pH=8.0. The slides were then incubated for 20 min at room temperature in 0, 0.1, 1.0, or 10 u/µl of DNase I (Roche) in the buffer above, rinsed 8 times in corresponding hybridization buffer containing 1.5% polyvinyl alcohol, then washed in deionized water, dried and imaged.

Example 7

Adsorption of Oligodeoxyribonucleotides to Aminosilanized Glass Surface

Cy5 (indodicarbocyanine, ☐☐ex)$_{max}$=651 nm, ☐☐em)$_{max}$=651 nm, red) dye-labeled 12 bases long (12-mer) and 24-mer oligodeoxyribonucleotide (oligonucleotide) probes were printed on an aminosilanized glass surface (3-aminopropyltrimethoxysilane) in the array format. Unadsorbed material was removed by extensive washing at room temperature. The bound Cy5 oligonucleotide signal was saturated beginning at 1 µM of the printed oligonucleotide. By reference to standard curves (FIG. 1A) the surface area per bound oligonucleotide could be calculated as a function of total applied probe concentration.

A well-defined density limit was detected (FIG. 1B) for both 12-mer and 24-mer probes. At surface saturation, to form the monolayer, it was found that 12-mer oligonucleotides with a dye label at the end occupy 10.6±0.3 $nm^2$ and 24-mer oligonucleotides with a dye label at the end occupy 16.6±0.5 $nm^2$. Thus, the data in FIGS. 1A-1B suggest that, assuming a 1 nm width for an oligonucleotide strand and full extension of the phosphate backbone, since the dye occupies about 1 $nm^2$, 12-mer oligonucleotides without a dye label at the end occupy 9.6 $nm^2$+/−0.3 $nm^2$ and 24-mer oligonucleotides without a dye label at the end occupy 15.6 $nm^2$+/−0.5 $nm^2$. Thus, since there are n−1 phosphates in an oligo of length n, the area occupied per phosphate, as measured experimentally in FIGS. 1A-1B, for 12-mer oligonucleotides=9.6 $nm^2$/11=0.88+/−0.03 $nm^2$ per phosphate equivalent and for 24-mer oligonucleotides=15.6 $nm^2$/23=0.68+/−0.02 $nm^2$ per phosphate equivalent.

Simple nucleic acid structure predicts that a fully extended nucleic acid strand will occupy approximately 0.7 $nm^2$ per phosphate equivalent, assuming close packing of oligonucleotides in the monolayer. Thus, the experimental data of FIGS. 1A-1B argue that in the range from 12-mers to 24-mers, the amount of surface area occupied per phosphate remains near to the 0.7 $nm^2$ value predicted from crude approximation. Given the experimental uncertainties involved, the data of FIGS. 1A-1B argue that the present invention is defined by an adsorbed surface density from about 0.5 nm² to about 1 nm² per phosphate. Thus, the data suggest that at adsorptive binding saturation, surface structure for both 12-mer and 24-mer probe approximates a densely packed monolayer of extended probe oligonucleotide strands.

Adsorptive attachment of such labeled oligonucleotides was found to be slowly reversible, probes remaining bound to the surface even after repeated washing with boiling deionized water. The adsorbed oligonucleotides could be removed by washing with boiling 5 M NaCl, indicating reversible non-covalent electrostatic interaction. Thus, the attachment of oligonucleotides to the surface can be attributed to extremely tight electrostatic interaction of the negatively charged phosphate backbone of nucleic acids to the positively charged amine groups of the surface.

Figure 1B:
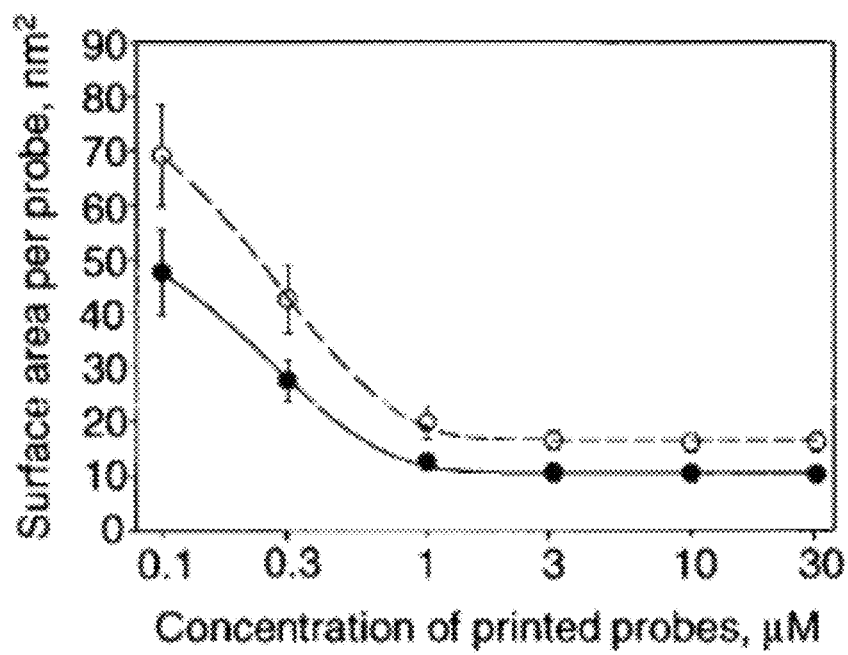

Also, FIGS. 1A-1B demonstrate the adsorption of 12mer and 24mer probes to the hybridization surface and that the mechanism of adsorption of both appears to be identical in terms of monolayer formation and the amount of surface area occupied by base. Thus, 12-mer and 24-mer probes adsorb by an identical mechanism. Therefore, since 12mer and 24mer adsorb identically, a probe that is of an intermediate length, such as 18 bases, or incrementally longer, such as 25 or 26 or even 30 bases would adsorb with the same mechanism as for 12-mer and 24-mer probes.

Example 8

Specific Hybridization of DNA to Adsorbed Oligonucleotides

To determine whether DNA could specifically hybridize to such a densely adsorbed oligonucleotide monolayer, microarrays were fabricated with six Cy5-labeled DNA oligonucleotide probes (red), printed in quadruplicate on the aminopropylsilane surface, slightly below saturation of probe adsorption (0.3 µM of added probe) and also at a saturating probe concentration of 3.0 µM. FIG. 2A depicts such a prototype. For 12-mer probes (FIGS. 2A-2C, left side of arrays) and 24-mer probes (FIGS. 2A-2C, right side of arrays) three probe sequence homologues were employed: a wild-type reference sequence (wt), a single nucleotide change per 12 bases (mt), and the randomly scrambled isomer (scr). Cy3- and Cy5-labeled oligodeoxyribonucleotides sequences (Biosource International) used in the experiments are provided in Table 1.

Microarrays were hybridized to a Cy3 (indocarboxycyanine, [☐☐]λ(ex)$_{max}$=552 nm, [☐☐]λem)$_{max}$=565 nm, green) labeled 12-mer target (FIG. 2B) or 24-mer oligonucleotide target (FIG. 2C), chosen to be complementary to the wild-type reference probe sequence. Hybridization was performed at a relatively high solution state target concentration (3 µM for 24-mer targets and 5 µM for 12-mer targets) to achieve saturation of the perfectly matched duplex binding equilibrium (yellow). At the saturation point, the bound target to probe ratio in these hybridization experiments has been measured to be 0.5 for 24-mer targets and 1 for 12-mer targets (see materials and methods). Thus, specificity data obtained comprise a representative average over the entire adsorbed probe monolayer.

Note that the 12-mer target (FIG. 2B) was designed to be complementary to both the wild type 12-mer and a segment of the 24-mer probe strands. Similarly, the 24-mer target (FIG. 2C) was designed to be complementary to both the wild type 24-mer probe and (with target strand overhang) to the 12-mer wild type probe strands. However, for the 24-mer target hybridization, experimental stringency has been increased so that binding to the 12-mer probe is too weak to be detectable (FIG. 2C, left side).

Visual inspection of the data reveals that, even at binding saturation, hybridization is highly specific. A single base mismatch in a 12-mer pairing, or two mismatches in a 24-mer pairing are seen to produce more than a 5-fold reduction of target binding (compare rows 2 and 4 in FIGS. 2B and 2C), while binding to the scrambled isomer cannot be detected. Thus, the data above have confirmed that oligonucleotides bound by adsorption to an aminosilanized surface retain the capacity to bind their antiparallel Watson-Crick sequence complement with measurable single mismatch discrimination within a 12-mer duplex and double-mismatch discrimination within a 24-mer pairing. Hybridization of the targets complementary to mt probes, as well as reversal of the targets and the probes additionally support this conclusion. In addition, the data confirm that both the 12mer and 24mer probes interact with target, in a standard microarray hybridization assay, as in FIGS. 1A-1B, via the same hybdidization mechanism. Therefore, since 12mer and 24mer hybridize to target identically, a probe that is of an intermediate length, such as 18 bases, or incrementally longer, such as 25 or 26 or even 30 bases also would hybridize to target as for 12-mer and 24-mer probes.

TABLE 1

| oligDNA name | oligoDNA sequence | 5' label | Color | Probe (P) or Target (T) |
|---|---|---|---|---|
| wt-12-as | ctgtagtgggcg SEQ ID NO: 1 | Cy5 | red | P |
| mt-12-as | ctgtagagggcg SEQ ID NO: 2 | Cy5 | red | P |
| scr-12-as | gtcgtggagcgt SEQ ID NO: 3 | Cy5 | red | P |
| wt-24-as | ctgtagtgggcgtc ctgctgttcc SEQ ID NO: 4 | Cy5 | red | P |
| mt-24-as | ctgtagagggcgtc cagctgttcc SEQ ID NO: 5 | Cy5 | red | P |
| scr-24-as | tggtgcggtgacaa gctcctcctg SEQ ID NO: 6 | Cy5 | red | P |

TABLE 1-continued

| oligDNA name | oligoDNA sequence | 5' label | Color | Probe (P) or Target (T) |
|---|---|---|---|---|
| wt-12-s | cgcccactacag SEQ ID NO: 7 | Cy3 | green | T |
| mt-12-s | cgccctctacag SEQ ID NO: 8 | Cy3 | green | T |
| scr-12-s | acgctccacgac SEQ ID NO: 9 | Cy3 | green | T |
| wt-24-s | ggaacagcaggac gcccactacag SEQ ID NO: 10 | Cy3 | green | T |
| mt-24-s | ggaacagctggacg ccctctacag SEQ ID NO: 11 | Cy3 | green | T |
| scr-24-s | caggaggagcttgtc accgcacca SEQ ID NO: 12 | Cy3 | green | T |
| wt-10-s-(-3') | cgcccactac SEQ ID NO: 13 | Cy3 | green | T |
| wt-10-s-(-5') | cccactacag SEQ ID NO: 14 | Cy3 | green | T |
| wt-11-s-(-3') | cgcccactaca SEQ ID NO: 15 | Cy3 | green | T |
| wt-11-s-(-5') | gcccactacag SEQ ID NO: 16 | Cy3 | green | T |
| wt-14-s | gacgcccacta cag SEQ ID NO: 17 | Cy3 | green | T |
| wt-16-s | aggacgccca ctacag SEQ ID NO: 18 | Cy3 | green | T |
| wt-18-s | gcaggacgcccactacag SEQ ID NO: 19 | Cy3 | green | T |
| wt-20-s-(-3') | aacagcaggacgcccactac SEQ ID NO: 20 | Cy3 | green | T |
| wt-20-s-(-5') | cagcaggacgcccactacag SEQ ID NO: 21 | Cy3 | green | T |
| wt-22-s-(-3') | ggaacagcaggacg cccactac SEQ ID NO: 22 | Cy3 | green | T |
| wt-22-s-(-5') | aacagcaggacgcc cactacag SEQ ID NO: 23 | Cy3 | green | T |
| wt-28-s | caggaacagcaggacg cccactacagtt SEQ ID NO: 24 | Cy3 | green | T |

Example 9

Formulation of the Symmetry Argument for a Helical Duplex

Strong, nearly irreversible adsorption of a single-stranded DNA oligonucleotide to a positively charged, aminosilanized surface suggests multiple electrostatic interactions between backbone phosphate groups and the surface, as depicted in FIG. 3A. The aminosilane monolayer presents to solution a plane of closely packed amine groups (FIG. 3D). During formation of a rotationally symmetric double helix with an ordinary 10 base pair pitch (FIG. 3C), the ribbon-like phosphate backbone of the probe (FIG. 3A) must detach from that densely charged surface, transiently, in order to wrap about the incoming target strand. In contrast, probe desorption from the surface is not required to explain formation of a non-helical duplex, such as that depicted in FIG. 3B.

If the duplex formed on the surface were a helix, with a relatively ordinary pitch, helical symmetry requires that both strands (target and probe) bind equally to the surface through their rotationally equivalent phosphate backbones (FIG. 3C); and thus, during the process of duplex dissociation, it would be impossible to remove the target without concomitant dissociation of the symmetrically equivalent probe strand. In view of the simplicity of the modeling technique and the substantial uncertainty of surface forces, the models of FIGS. 3A-3D should be treated as an approximation.

FIGS. 3A-3D show the result of a molecular modeling calculation for a 24mer probe, that has adsorbed to a microarray substrate via a non-helical mechanism consistent with the data of FIGS. 1A-1B & 2A-2C. Because of the linear nature of the model, the model would not change materially for probes incrementally longer or shorter than about 24 bases. Thus, calculations for probes incrementally longer or shorter than about 24 bases would generate a structure that is similar to those of FIGS. 3A-3D.

Example 10

Asymmetric Dissociation of the Strands from the DNA Duplex Formed on Aminosilanized Glass Surface Such experimental dissociation analysis is shown in FIGS. 4A-4B, which depicts a dissociation kinetics experiment similar in form to the equilibrium binding experiment of FIGS. 2A-2C. Briefly, a Cy3-labeled 12-mer target (left) or a Cy3-labeled 24-mer target (right) was hybridized to microarrays of Cy5-labeled oligonucleotide probes as described in FIGS. 2A-2C. Target was then dissociated from the probes by stringent washing as a function of time. At each time point, binding signals were quantified fluorimetrically by deconvoluting the signal from the bound duplex (yellow) into its two components: Cy3 target (green) and Cy5 probe (red).

Comparison of the initial and final dissociation time points (FIGS. 4A-4B, array 2 vs array 5 and subsequent bar graphs), reveals that during 16 minutes of washing, the target strand of both the 12-mer and 24-mer duplex pairings is greater than 90% dissociated from the microarray, under conditions which have left the density of adsorbed probes intact (compare array 1 vs array 5 and subsequent bar graphs). Moreover, a repeat of hybridization upon an array, which had been previously hybridized and then washed for 16 minutes (array 6) reveals that the process of hybridization and dissociation is fully reversible, thereby confirming that probe has not been lost or otherwise altered structurally during the course of duplex formation and dissociation. Also, the experimental dissociation data for both 12mer probes and 24mer probes are consistent with the non-helical model of FIGS. 3A-3D. Since targets bound to 12mers and 24mer dissociate selectively by an identical non-helical mechanism, a probe on a microarray device that is of an intermediate length, such as 18 bases, or a probe that is incrementally longer, such as 25 or 26 or even 30 bases, would behave similarly.

Again, since the initial ratio of bound target to probe has been measured to be close to 1 in these experiments, one may conclude that the observed kinetic asymmetry during dissociation is a general property of all duplex pairings formed on the microarray surface. This highly asymmetric kinetic behavior is not easily rationalized in the context of a helical structure for the surface bound duplex, since in that case the targets would be bound to the surface in a manner equivalent to probe strands (FIG. 3C).

To confirm that important experimental observation, a 3 mm² area of the aminosilanized glass surface was saturated with the same set of three Cy5-labeled 12-mer and 24-mer probes (wt, mt, scr) described for microarray analysis. Cy3-labeled complementary targets (green) were hybridized to this patch of adsorbed probe under conditions identical to those described for microarray analysis in FIGS. 4A-4B and imaged.

The surface was then rinsed briefly in hybridization buffer (to remove unbound target), followed by application of the wash buffer to initiate dissociation of the duplex, as described previously for microarray analysis. FIG. 5A presents those image data. The first row presents raw image data for 1 mm² of the probe-modified surface monolayer prior to hybridization; the second row presents 1 mm² of the same surface after hybridization to target binding saturation; and the third row presents 1 mm² of the surface after hybridization and then a 15-minute wash. Overall, bulk analysis of surface hybridization in FIG. 5A (rows one-three) directly confirms the specificity and kinetics of dissociation that had previously been monitored in the microarray format.

After 15 minutes of dissociation, the wash buffer was collected and pipetted onto a clean aminosilanized glass slide and imaged. Those raw image data are presented in row four. Strong Cy3 and weak Cy5 signals are obtained (FIG. 5A). When the experimental protocol was reversed and probes were used as solution state targets and targets were used as surface bound probes, the result was reversed, i.e. the wash buffer contained strong Cy5 and weak Cy3 signals (FIG. 5B) in relative proportion, which is generally the inverse the distribution obtained in the initial analysis. Overall, the data of FIGS. 5A-5B confirm a 5-20 fold kinetic asymmetry for dissociation of the two surface bound duplex strands.

Example 11

Asymmetric DNase I Digestion of the Strands from the DNA Duplex Formed on Aminosilanized Glass Surface In order to confirm the observed strand asymmetry by a third method, the surface bound duplex was analyzed by quantitative DNase I digestion (FIGS. 6A-6B). Briefly, the experiment was designed exactly as in FIGS. 4A-4B, but rather than being monitored for dissociation kinetics, bound duplexes were digested at room temperature for 20 min as a function of increasing DNase I concentration (arrays 2-5 comprising 0, 0.1, 1.0 & 10 units of DNaseI, respectively). As seen by direct comparison (array 1 vs array 5) fluorescence signals from the adsorbed probe strands are completely protected from DNase I cleavage (presumably due to the direct phosphate backbone interaction with surface amines), under conditions in which greater than 90% of the bound 12-mer (FIG. 6A) or 24-mer (FIG. 6B) target strands were digested away with DNase I. However, re-hybridization of arrays which had been previously digested at the highest DNaseI concentration (compare array 2 vs array 6) suggests a small but finite loss of probe capacity to bind target, which may reflect a slow but finite rate of probe cleavage by DNase I, which does not appear to alter probe association with the surface, as detected by fluorescence.

When a standard B-form double helix is formed in solution first and then deposited on the surface, it is well known that DNase I digests both strands symmetrically (Rhodes D et al., 1980, *Nature* 286:573-578). Thus, the pattern of highly asymmetric DNase I protection detected in this study has confirmed the idea that the phosphate backbone of adsorbed probe strands is not available for interaction with solution state DNase I, but instead faces the aminosilanized surface. On the other hand the data confirm that the phosphate backbone of the bound target strand faces the solution phase and remains readily accessible to DNase digestion.

The experimental dissociation data for both 12mer probes and 24mer probes are consistent with the non-helical model of FIGS. 3A-3D. Since targets bound to 12mers and 24mers are digested selectively by an identical non-helical mechanism, a probe on a microarray device that is of an intermediate length, such as 18 bases, or a probe that is incrementally longer, such as 25 or 26 or even 30 bases, would behave similarly.

Example 12

Duplex Forms Along the Length of More than Two Helical Turns of B-Helix

Figure 7:
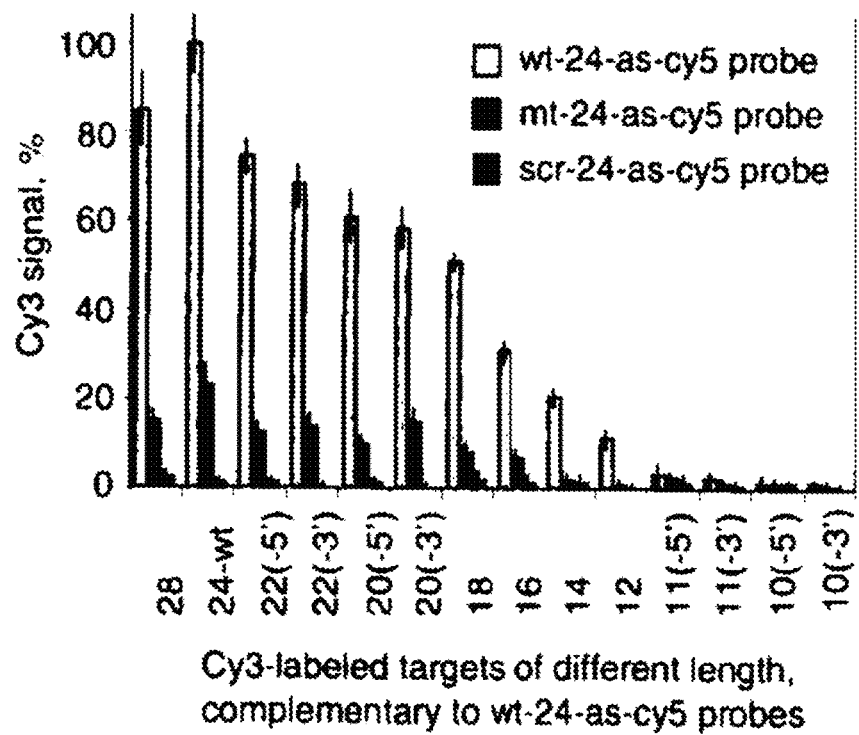
FIG. 7 illustrates the length dependence of target hybridization stability upon a 24 base surface-bound probe. The following protocol was employed at room temperature throughout: (1) pre-hybridization in 60 mM sodium carbonate, 20% formamide, 5×Denhardts, 1.5% polyvinyl alcohol (PVA), pH 9.5 for 1 min, (2) 10 min hybridization at 3 µM of Cy3-labeled targets (10-28 bases) in 60 mM sodium carbonate, 20% formamide, 5×Denhardts, 0.6% PVA, pH=9.5, (3) two rinses in pre-hybridization buffer, (4) 10 min wash in 60 mM sodium carbonate, 25% formamide, 5×Denhardts, 0.6% PVA, pH=9.5, (5) brief wash in de-ionized H₂O, (6) drying. Sequences of oligonucleotides in x axis are provided in Table 1. The arrays used in these experiments are identical to the array shown in FIG. 2A. The bar graphs represent the normalized means and the standard deviations of the mean from 12 array elements.

Although both dissociation kinetics and DNase protection assays have suggested a highly asymmetric duplex structure and are generally inconsistent with a symmetric double helix, such a simple interpretation of the data can only be made if the duplex under study is fully-formed over the span of the surface bound probe. To answer this question, a set of ten Cy3-labeled (green) target oligonucleotides of varied length were synthesized and hybridized to the arrays described in FIG. 2A. Under stringent hybridization and washing conditions, it was found that binding stability to complementary 24-mer probes, printed at 0.3 µM on aminosilanized surface, increased as a function of target length up to the full probe length of 24 bases (FIG. 7) and then leveled thereafter. Throughout, base-pairing specificity was maintained at the level of two base changes per 24-mer probe. This relatively simple outcome suggests that a sequence specific duplex is forming, on average, along the entirety of the available 24 base probe strand, which if the resulting product were a standard B-form helix, would correspond to slightly more than two helical turns.

The experimental hybridization data demonstrates that targets from 12 bases to 24 bases bind to the underlying 24 base long probe by the same overall non-helical mechanism as demonstrated in Examples 9-10. Since 12-mers up to 24-mers targets bind to 24mer probes by the same basic mechanism, a probe on a microarray device that is of an intermediate length or incrementally longer, such as 18-30 bases, would behave similarly. Also, the data clearly show that in the present hybridization device, the probe can bind to target by the same basic mechanism, even if the probe contains nucleic acid that is not used for hybridization, i.e., if the probe is longer than the target nucleic acid to which it will bind to form the duplex.

Example 13

Protocol for Repeatable, Reliable Adsorptive Microarray Formation and Hybridization: Preparation of the Adsorptive Surface Microscope slides were cleaned in deionizing water, and dried in dust free oven. The adsorptive surface was applied on the surface of the glass by equilibrating adsorptive surface material in a vacuum oven at 82° C., overnight at 27 mm Hg.

Preparation of the Oligonucleotide

Presynthesized, linker-free oligonucleotides were dissolved in de-ionized water. Dimethyl sulfoxide (DMSO) was used to uniformly dry the oligonucleotide to create a uniform monolayer on the adsorptive surface. Saturation limits of the surface for the oligonucleotide were calculated by using labeled oligonucleotides and the concentration of the oligonucleotides was maintained over the saturation limits.

Direct Adsorption of the Oligonucleotides to the Surface

Oligonucleotides were adsorbed to the surface by using a robotic machine to dispense controlled, known volumes, such that each drop of the oligonucleotide solution is similar (<1% variation) to the other one on the hybridization device.

Prehybridization

The adsorbed oligonucleotide is incubated with a prehybridization solution containing phosphate buffer (potassium phosphate monobasic, sodium phosphate dibasic, pH 8.0) with 5×Denhardt's solution and 1% sodium dodecyl sulfate (SDS) for 15 minutes.

Hybridization and Wash

Hybridization is carried out by applying 20 µL of fluorescently labeled target (full length mRNA, or cDNA) from the sample of interest, and incubated overnight at room temperature under humidifying conditions. After a 12 hour hybridization, washing is done in a phosphate buffer with at least up to of half the strength (150 mM) in molarity compared to the binding buffer, without any Denhardt's solution.

Scan

Slides after the wash are dried by centrifugation or heat, are scanned using either a laser or CCD based scanner, to generate a fluorescent image. Fluorescent image intensities are obtained by the quantitation of the spots on the microarray by either applying a grid or by automatic spot finding algorithms.

Example 14

Comparative Example

A first set of Cy3-labeled DNA 50-mers were directly adsorbed on to a uniform cationic surface using vapor deposition according to Example 1. A second set of Cy3-labeled DNA 50-mers were adsorbed on to a uniform cationic surface according to the solution dip method of CeI Associates (CSA-25; www.cel-1.com/). The surfaces were then washed with the wash buffer of Example 16 for 5 minutes or 24 hours. The fluorescent intensity of the DNA remaining, i.e., remaining Cy3-labeed oligodeoxyribonucleotides directly adhered to a surface, after washing is shown in FIGS. 8A-8D and Table 2. Fluorescent intensity after five minutes of washing is substantially the same as at time zero. However, background at time zero was undetectable.

TABLE 2

| FIG. 8 | Example 1 | | Cel Associates | |
|---|---|---|---|---|
| | A | B | C | D |
| Wash | 5 min | 24 h | 5 min | 24 h |
| Spot intensity | 1208 | 1139 | 1023 | 192 |
| Background | 26 | 21 | 369 | 79 |
| Signal/Background | 46.5 | 54 | 2.8 | 2.4 |

Example 15

Effect of Capping on Hybridization

A 40-mer DNA probe printed at 1.0 µM was hybridized with a perfectly matched target 40-mer. The target 40-mer was hybridized at total concentration of 1.0 µM comprising 9.1 µM Cy3-labeled target. Two methods of capping were used. Chemical capping was achieved by a vapor phase method wherein 0.5 M acetic anhydride in DMF at 50° C. amd 25 inches of mercury for 16 hours followed by a liquid phase of 9.5 M succinic anhydride in DMF at room temperature for 1 h. Alternatively, surfactant capping was achieved by using SDS in the prenybridization buffer.

Figure 9A:
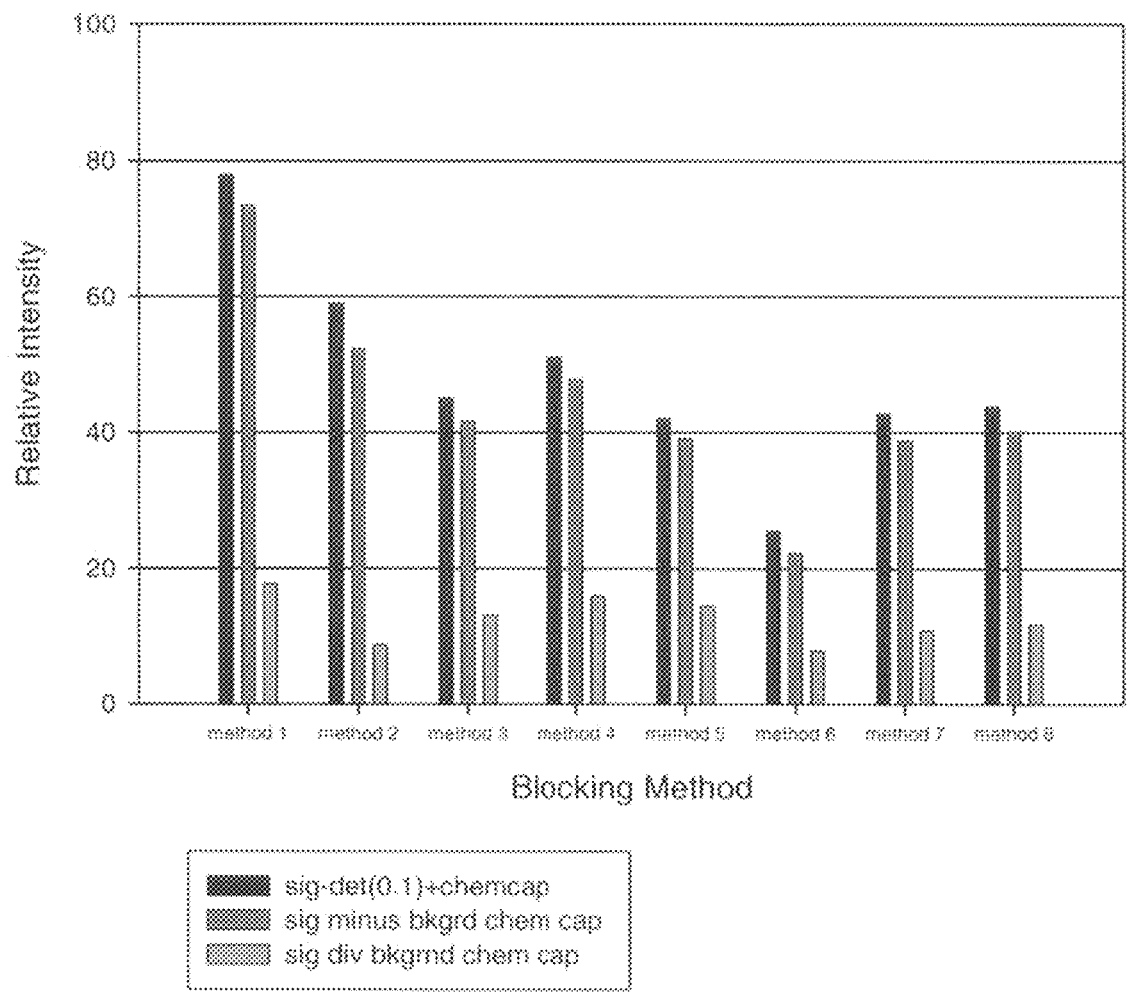
FIGS. 9A-9B illustrate the effect of capping and hybridization conditions on detection of probe-target duplex formation. Absolute signal, absolute signal minus background fluorescence, and the ratio of signal to background is shown for capped (FIG. 9A) and uncapped (FIG. 9B) DNA microarrays printed with 40-mer probes.
Figure 9B:
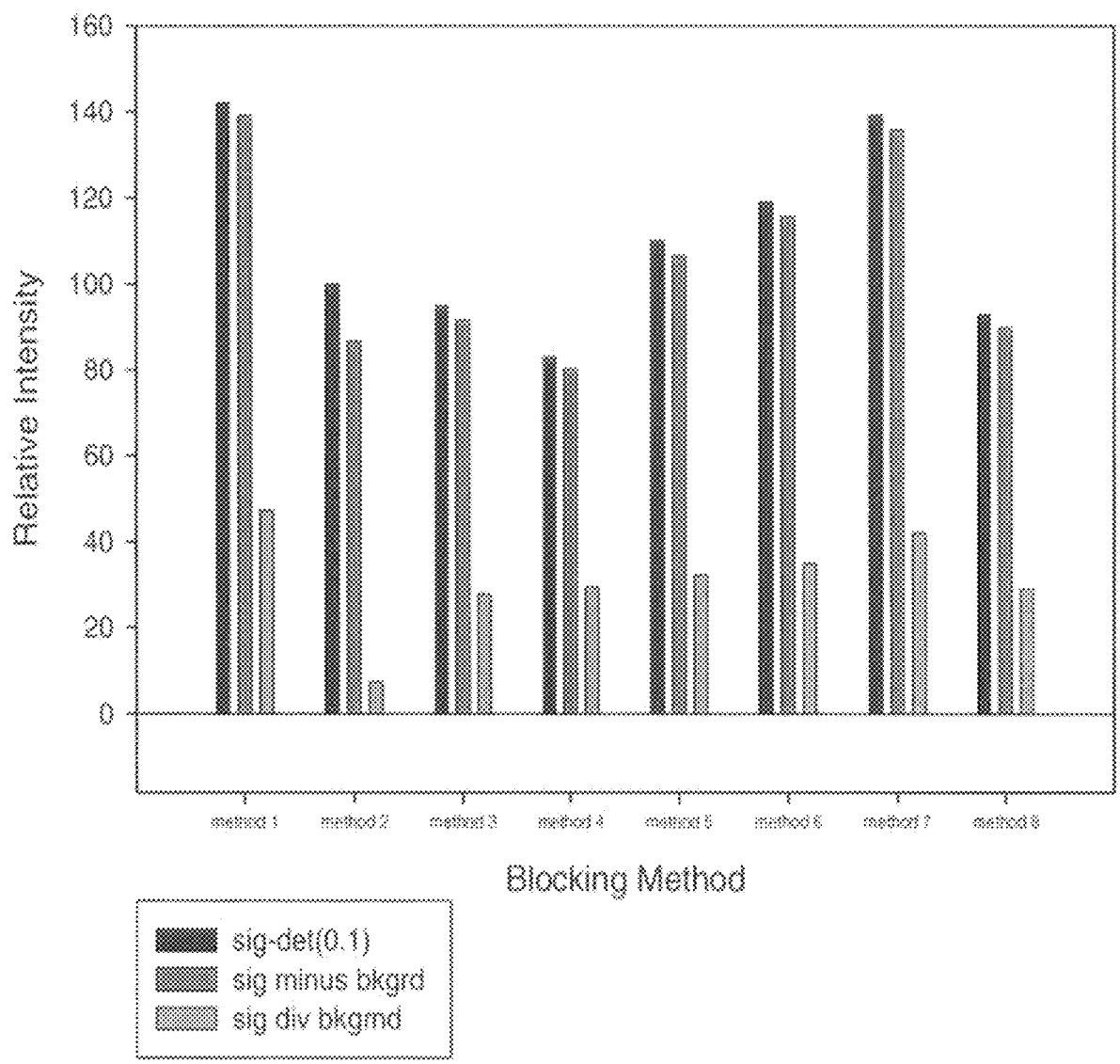

Approximately, 40 prehybridization/hybridization buffer combinations were tested for blocking efficiency. All displayed satisfactory performance. Eight of the preferred combinations appear in Table 3 and FIGS. 9A-9B.

TABLE 3

| | Prehybridization buffer | Hybridization buffer |
|---|---|---|
| Method 1 | 1% SDS<br>5× Denhardt's<br>300 mM pH 8.0 buffer | 1% SDS<br>5× Denhardt's<br>300 mM pH 8.0 buffer |
| Method 2 | 1% SDS<br>300 mM pH 8.0 buffer | 0.2 µg/µl cot1 DNA<br>1% BSA<br>300 mM pH 8.0 buffer |
| Method 3 | 1% SDS<br>5× Denhardt's<br>300 mM pH 9.5 buffer | 1% SDS<br>5× Denhardt's<br>300 mM pH 9.5 buffer |
| Method 4 | 1% SDS<br>5× Denhardt's<br>300 mM pH 9.5 buffer | 0.2 µg/µl cot1 DNA<br>5× Denhardt's<br>300 mM pH 9.5 buffer |
| Method 5 | 1% SDS<br>5× Denhardt's<br>300 mM pH 9.5 buffer | 5× Denhardt's<br>300 mM pH 9.5 buffer |
| Method 6 | 1% SDS<br>5× Denhardt's<br>300 mM pH 9.5 buffer | 300 mM pH 9.5 buffer |
| Method 7 | 1% SDS<br>5× Denhardt's<br>300 mM pH 8.0 buffer | 1% SDS<br>0.2 µg/µl cot1 DNA<br>5× Denhardt's<br>300 mM pH 8.0 buffer |
| Method 8 | 1% SDS<br>5× Denhardt's<br>300 mM pH 8.0 buffer | 0.2 µg/µl cot1 DNA<br>5× Denhardt's<br>300 mM pH 8.0 buffer |

Example 16

Detecting Solution-State cDNA with Adsorptive Microarrays

Probes were 60-mers of predetermined sequence (derived from mouse p53-related genes) and were adsorbed onto a glass surface according to Example 13. Targets for hybridization to the microarray were prepared as follows—Total cellular RNA was extracted from untreated and [ ]γ-irradiated mouse thymus tissues, by a modified guanidine-isothiocyanate technique (Qiagen, Valencia, Calif., USA). The quality and the concentration of the RNA were checked using both spectrometric and dye tests (Invitrogen, Carlsbad, Calif., USA). 10 µg of total cellular RNA from untreated mouse thymus tissue was reverse transcribed using MMLV-RT (Clontech, Palo Alto, Calif., USA) in presence of Cy3 dye (Amersham Biosciences, Piscataway, N.J.) which resulted in Cy3 labeled mRNA from untreated mouse thymus. 10 µg of total cellular RNA from γ-irradiated mouse thymus tissue was reverse transcribed using MMLV-RT (Clontech, Palo Alto, Calif., USA) in presence of Cy5 dye (Amersham Biosciences, Piscataway, N.J.) which resulted in Cy5 labeled mRNA from untreated mouse thymus, using reverse transcription protocols supplied by Clontech in the MMLV-RT kit.

The resulting labeled cDNA was precipitated by incubation in 95% ethanol for 1 hour at −70° C., and the precipitate was pelleted using a microcentrifuge at 12,000 rpm for 10 minutes. The pellet was washed in 70% ethanol and air dried. The dried pellet was dissolved in the hybridization buffer.

Figure 10:
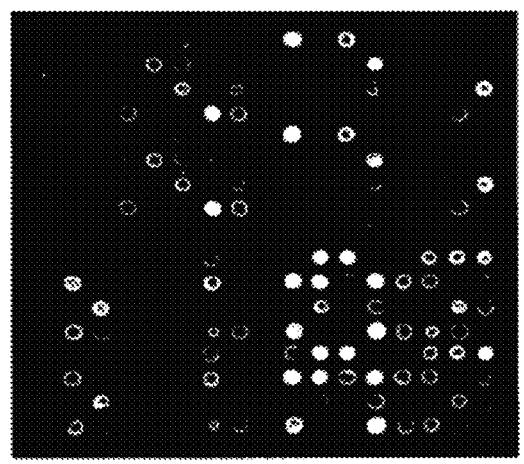
FIG. 10 depicts an adsorptive microarray hybridized with cDNA targets derived from untreated (green) or γ-irradiated (red) mouse thymus tissue.
Figure 11A:
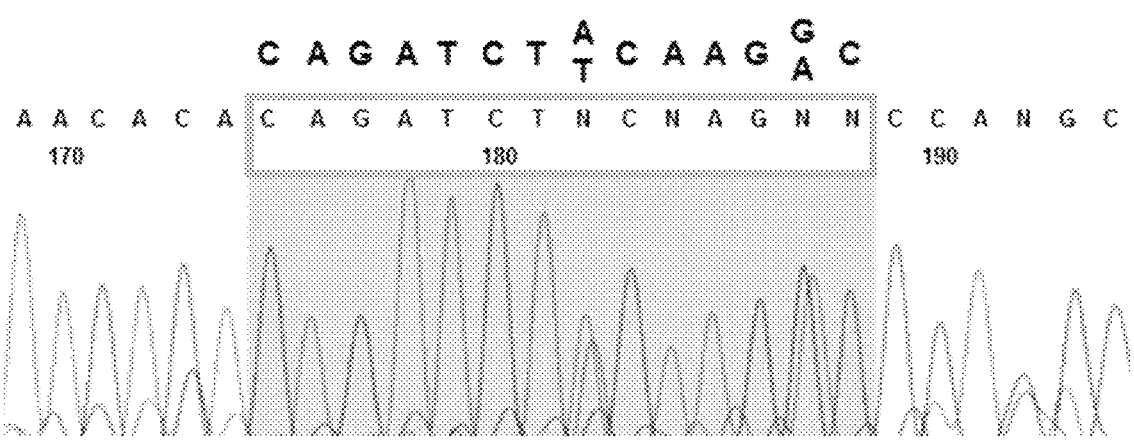
FIGS. 11A-11E depict sequencing profiles and microarray hybridization data using probes that are sequence variants 1-8 (SEQ ID NOS: 25-32) of nucleotides 265-278 of human HLA-B. The 30-mer variants 1-8 were printed to form microarrays, hybridized to a Cy-3 labelled PCR product derived from a number of known sequence variants of HLA-B and hybridization data was obtained, as in FIGS. 2A-2C.
Figure 11B:
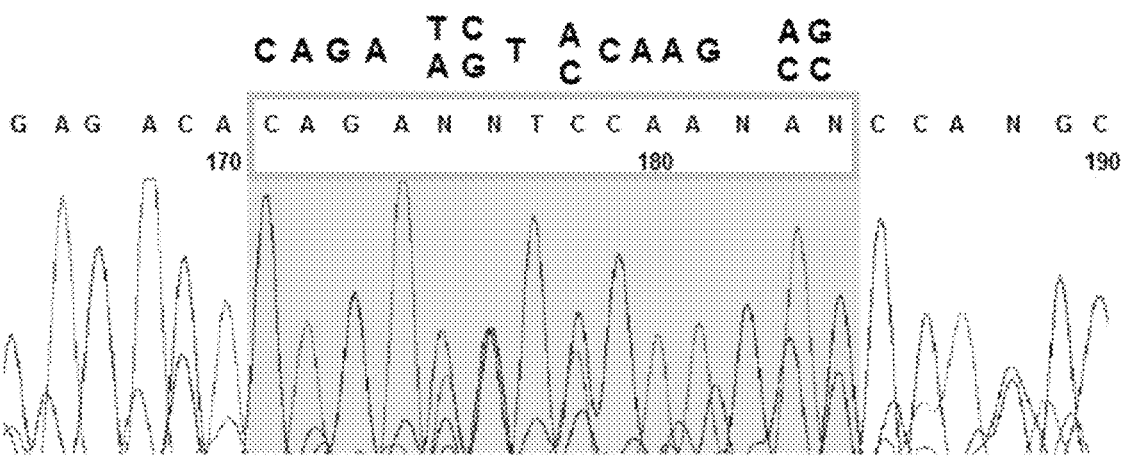
Figure 11C:
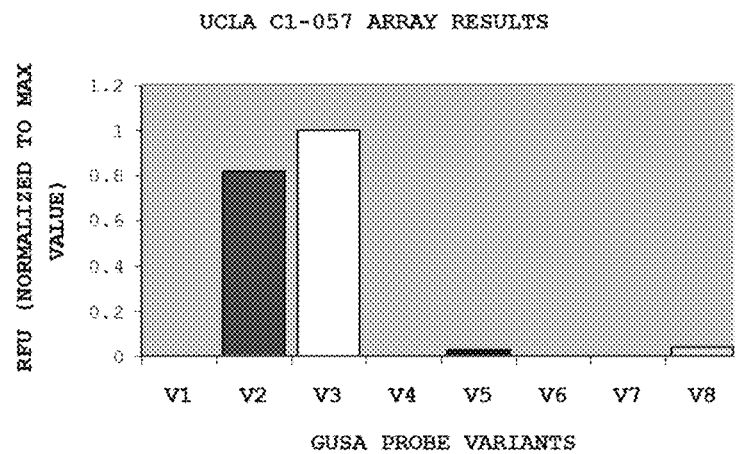
Figure 11D:
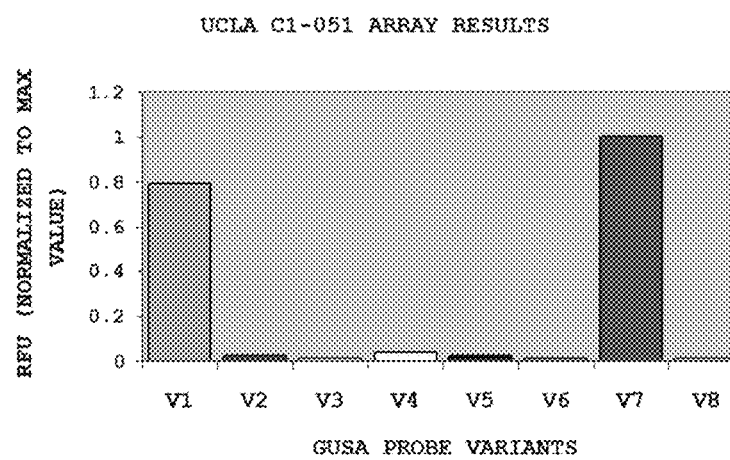
Figure 11E:
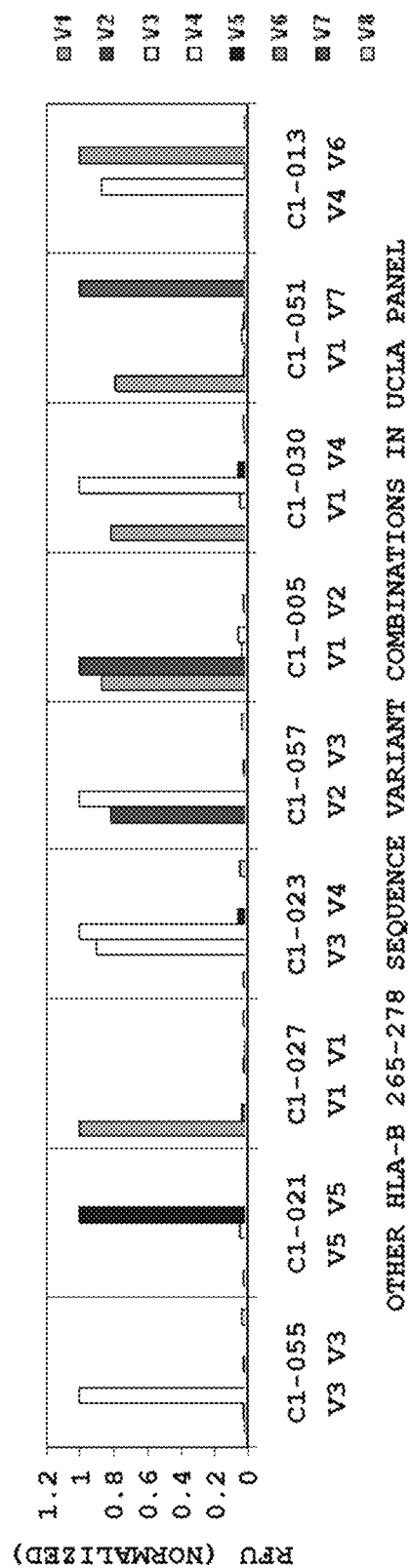
Figure 12A:
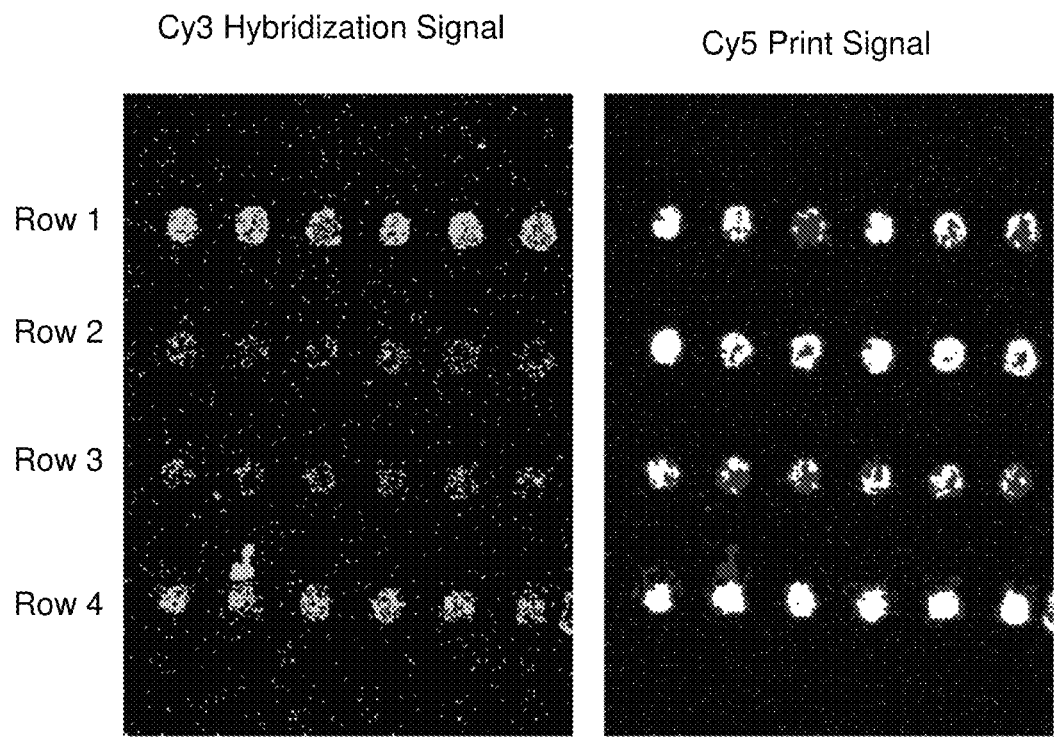
FIGS. 12A-12E illustrate the results of microarray hybridization with Cy3-labeled amplicon target from exon 2 of HLA-B to probes printed on various metal oxide surfaces. The surfaces are: an agarose-ferrite particle composite where the surfaces of the ferrite particles are the substrate for probe binding (FIG. 12A), an agarose-ferrite particle composite where the surfaces of the ferrite particles are coated with aluminium oxide is the substrate for probe binding (FIG. 12B), an agarose-ferrite particle composite where the surfaces of the ferrite particles are coated with magnesium oxide is the substrate for probe binding (FIG. 12C), an agarose-ferrite particle composite where the surfaces of the ferrite particles are coated with zinc oxide is the substrate for probe binding (FIG. 12D), and an agarose-ferrite particle composite where the surfaces of the ferrite particles are coated with zirconium oxide is the substrate for probe binding (FIG. 12E). Row 1 probes are SEQ ID NO: 33, row 2 probes are SEQ ID NO: 34, row 3 probes are negative control without any human sequences, i.e., differs from the human sequences by more than 20% over the region tested, and row 4 probes are two sequences, SEQ ID NOS: 35-36.
Figure 12B:
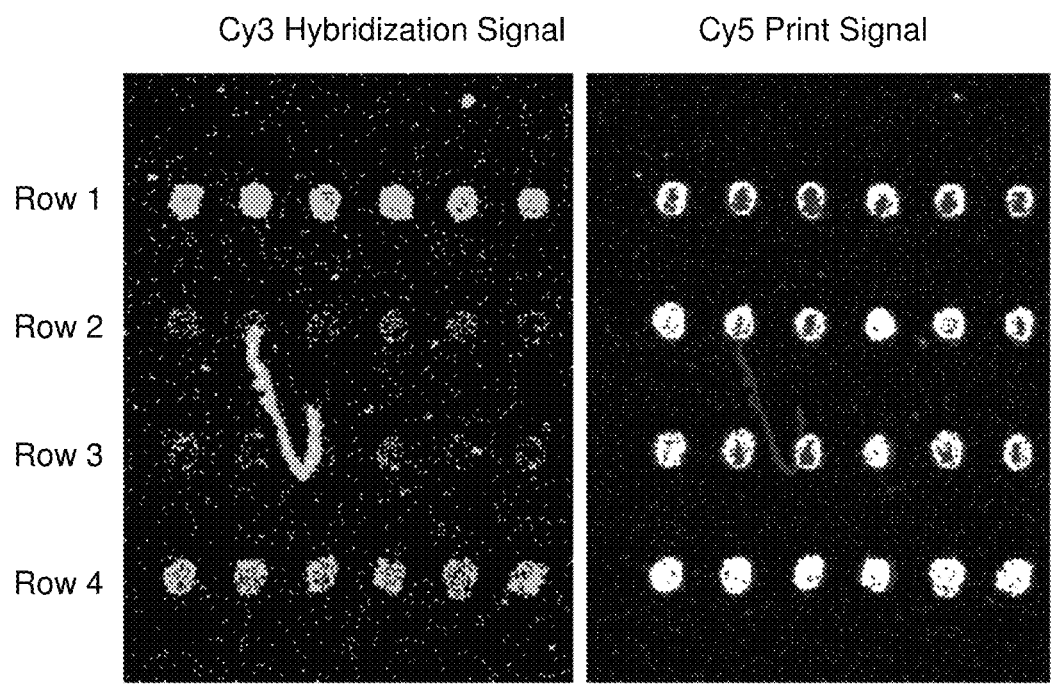
Figure 12C:
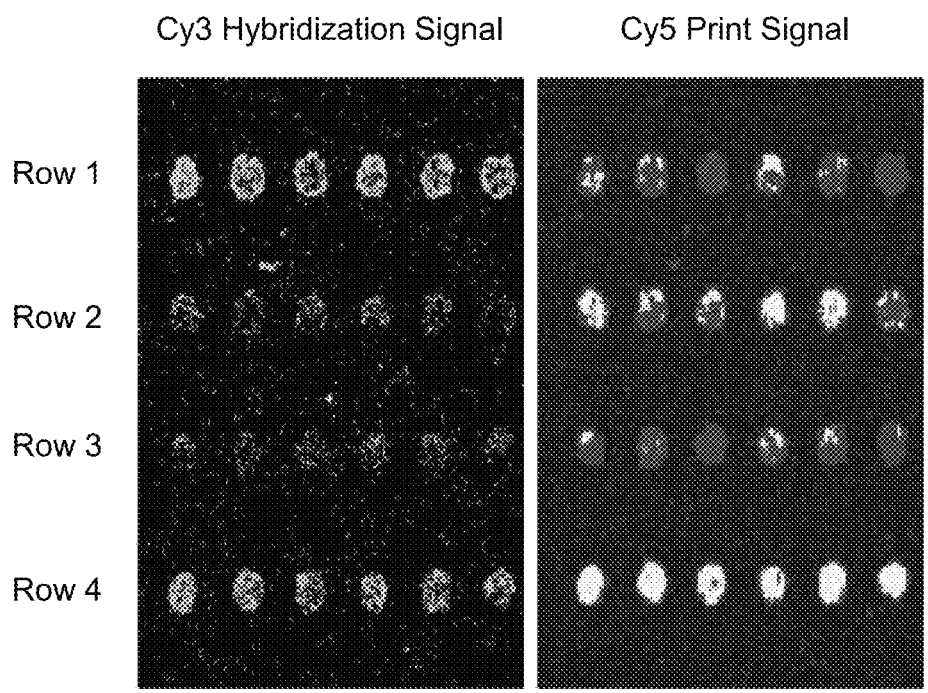
Figure 12D:
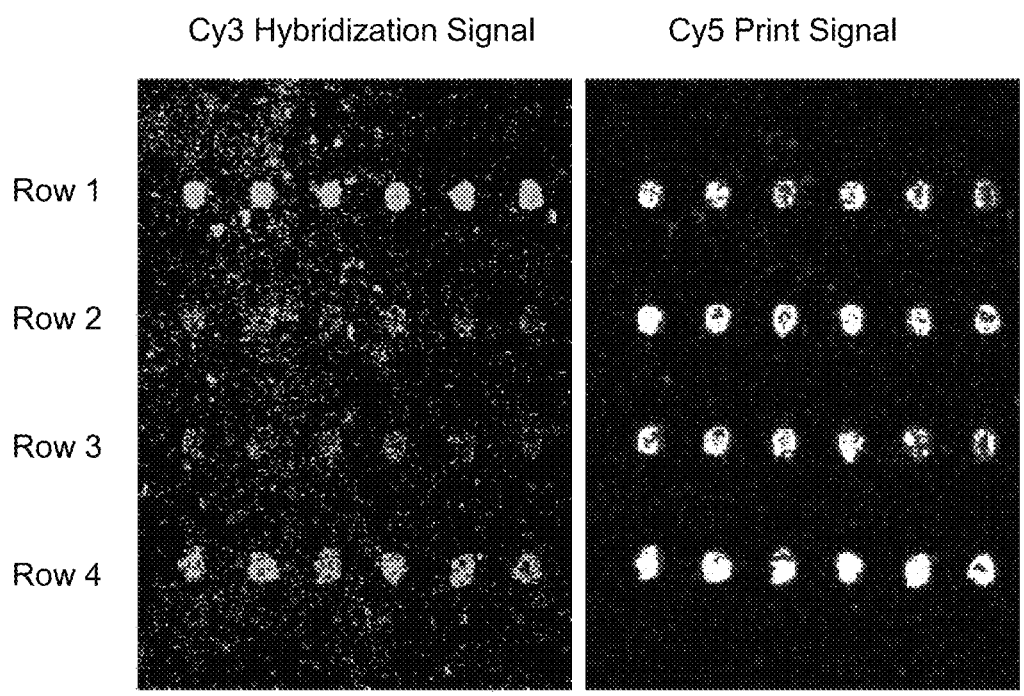
Figure 12E:
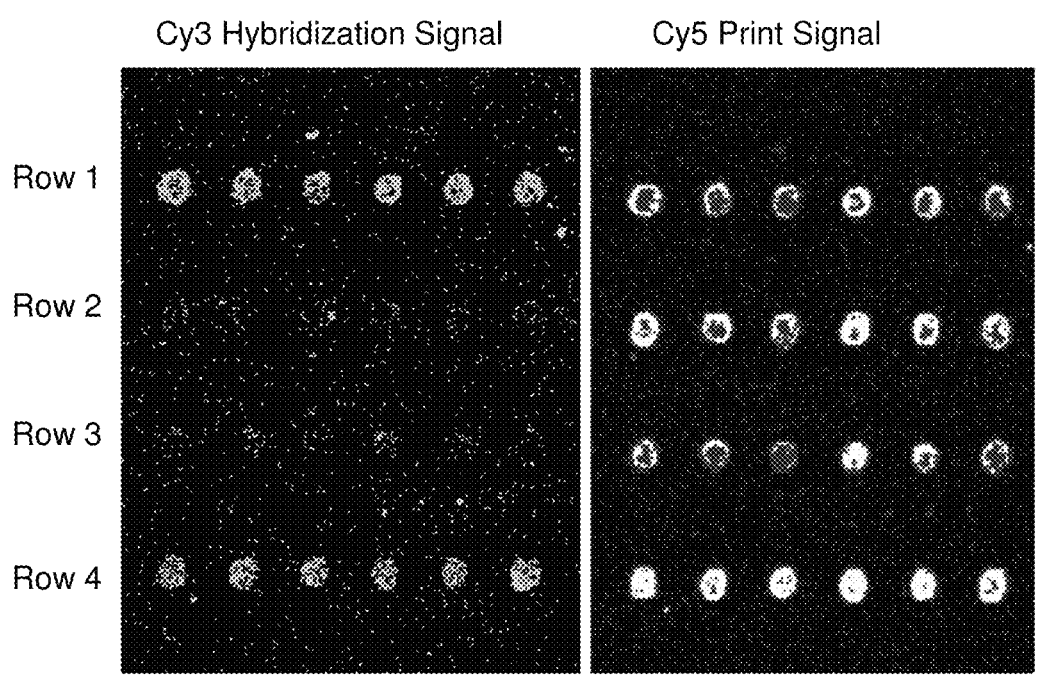

Equal amounts of Cy3 and Cy5 labeled cDNA targets were added to the microarray and incubated at room temperature in a humidifying chamber for 12 hours. After 12 hours, the unbound target was removed by washing the microarray with washing buffer on an orbital shaker for 30 minutes with buffer changes every 10 minutes. At the end of 30 minutes, the microarray was air dried and scanned in a CCD imager (Array Worx, Applied Precision, Inc. Issaquah, Wash., USA□□□□The resulting image is read as follows, for each spot on the array, the amount of green intensity signifies the level of untreated gene and the amount of red intensity signifies the level of □□-irradiated gene. Yellow color signifies equal levels of gene expression from both the samples (FIG. 10).

Pre-hybridization buffer and hybridization buffer comprised 300 mM phosphate buffer (0.017 M monobasic sodium phosphate, (monohydrate)), 0.305 M dibasic sodium phosphate, pH 8.0; 5×Denhardt's solution (0.1% Ficoll (type 400), 0.1% polyvinylpyrrolidone, and 0.1% bovine serum albumin); and 1% sodium dodecyl sulfate. Washing buffer was 150 mM phosphate buffer (0.0085 M monobasic sodium phosphate, (monohydrate), 0.15 M dibasic sodium phosphate, pH 8.0); 1% sodium dodecyl sulfate.

Example 17

HLA-B Variant Adsorptive Probes Flanked by Poly-T Sequences

As shown in Table 4, a series of probes are described which have at their center a 14 base region of the human HLA-B gene from exon 2 centered around codon 67, i.e., codon 65 through the first two bases of codon 69. The sequences are nucleotide coding sequences (CDS) referenced from the EMBL-EPI HLA database sequence alignment tool (no introns). These 14 base long sequences, which are variants of the nucleotide sequence at bases 265-278 of human HLA-B are flanked to either side by a string of eight thymine bases, or poly-T sequences, which are used as an inert flanking domain to enhance surface adsorption of the probe, without altering the ability of the central 14-mer region to bind to a cognate nucleic acid target, thus generating probes with an overall length of 30 bases. Each of these 30mers posess base changes, shown in bold, at their center which render them specific for a known sequence variant of the HLA-B gene. FIGS. 11A-11E depict the sequencing profiles and hybridization of these probes as done in Example 8.

TABLE 4

| HLA-B<br>Probe | Sequence | SEQ ID<br>NO |
|---|---|---|
| Variant 1 | TTTTTTTTCAGATCTCCAAGACTTTTTTTT | 25 |
| Variant 2 | TTTTTTTTCAGATCTTCAAGACTTTTTTTT | 26 |
| Variant 3 | TTTTTTTTCAGATCTACAAGGCTTTTTTTT | 27 |
| Variant 4 | TTTTTTTTCAGATCTGCAAGACTTTTTTTT | 28 |
| Variant 5 | TTTTTTTTCAGATCTGCAAGGCTTTTTTTT | 29 |
| Variant 6 | TTTTTTTTCGGAACATGAAGGCTTTTTTTT | 30 |
| Variant 7 | TTTTTTTTCAGAAGTACAAGCGTTTTTTTT | 31 |
| Variant 8 | TTTTTTTTCAGATCTACAAGACTTTTTTTT | 32 |

FIGS. 11A-11E demonstrate that these probes, which may be up to about 30 bases in length, usefully possess two domains within each probe. A first domain, which may be about 10-24 bases long, binds target DNA to form a duplex and a second domain, flanking the first probe domain to one or both sides, comprises a material which is inert to ordinary nucleic acid hybridization, such as poly-T, or some other polymer or inert sequence that is non-complementary to the target, such as, but not limited to, inosine. This additional flanking sequence can additionally stabilize probe adsorption to the surface by the mechanism demonstrated in FIGS. 1A-1B, 2A-2C and 3A-3D, while keeping the target binding domain of the probe limited to a length that is shorter than the full span of the surface-adsorbed probe.

That combination of a short target binding region flanked by an inert region to one or both sides of the probe allows an optimal combination of surface adsorption (because the probe is long) coupled to enhanced target binding discrimination (because a shorter, hybridization domain can be implemented).

Example 18

Metal Oxide Surface-Coated Slides: General Methods

Metal oxide surface coated slides were made using clay and metal oxide particles suspended in an agarose matrix. Generally, metal oxide particles were suspended in a solution of 10 mM $Na_2B_4O_7$-50 mM Boric acid-10 mM NaF at a particle concentration of 20 mg per mL. In a separate vessel agarose is dissolved in a solution of 10 mM $Na_2B_4O_7$-50 mM Boric acid-10 mM NaF at a concentration of 2% wt to volume, and heated to boiling. The agarose solution is placed in a water bath at 80 to 90 C, and to this solution is added 1 volume of the 20 mg per mL metal oxide suspension, and mixed to an even suspension. The slides are made by spreading 1 mL of the agarose-metal oxide suspension onto a 1×2' area of a 1×3' slide, and this agarose suspension is allowed to cool and gel. The slide is then dried under ambient conditions of temperature and humidity until the gel is completely collapsed and dry on the slide.

Prior to printing the oligonucleotide probes as an array on these slides, the slide is treated for 5 min with glacial acetic acid, then rinsed with water, followed by a 1 minute wash with acetone or with 50% ethanol-water solution. The slide is then allowed to dry under ambient conditions. The printing of DNA probes at an oligonucleotide concentration of 75 umolar in a solution of 150 mM sodium phosphate buffer (pH=8.5), 0.005% sodium lauroyl sarcosine. The slides were printed incubated at 50% humidity for ~16 hrs, irradiated with 3000 millijoules of ultraviolet light to cross link the probes. The slides were then stored at ambient temperatures and humidity until hybridization.

The target hybridization process was to dilute a 30 cycle PCR amplified target with one volume of water, and incubate this solution for 10 min in a heat block at 110 C, then immediately cool this solution in 4° C. water bath. The probe is then mixed with the following solution, 50 mM Boric acid, 10 mM sodium tetraborate, 10 mM NaF, 1 mM $NaH_2PO_4$, 0.1% Tween-20, 100 ug/mL of Herring Sperm DNA, and 5×Denhardts Solution. Forty microliters of this probe mix was applied to each slide and put under a glass coverslip, and incubated in a humidity chamber at room temperature for 16 hours. Post hybridization processing of the microarrays is a 20 min soak in 2×SSC followed by a 5 min soak in 1×SSC, and 2 min treatment in 0.2×SSC. The slides were air dried and imaged by an imager.

Kaolin Particles Coated with Aluminum Oxide

Aluminum oxide surface-coated kaolin particles were synthesized by suspending acid washed kaolin at a concentration of 20 mg per mL in a solution of 50 mM HCl-2 mM $AlCl_3$. To this metal chloride/kaolin suspension mix is added an equal volume of 2M $NH_4OH$ and mixed rapidly, and this mixed solution is incubated for 1 hour at room temperature. The kaolin particles were concentrated by centrifugation (1500×g for 3 min). The supernatant is discarded and the particle are resuspended in water at a particle concentration of 20 mg per mL followed by a pelleting of the particles by centrifugation (1500×g for 3 min). This process was repeated until the pH of the supernatant is the same as the incoming water wash (between 5 to 8). These particle pellet is then resuspended in a solution of 100 mM $NaCO_3$ and incubated for overnight. Prior to mixing the particles with agarose, the particles are pelleted from the carbonate buffer, washed twice (resuspension-pelleting) in water at a concentration of 20 mg/mL.

Ferrite Particles Coated with Metal Oxides

Aluminum oxide ($Al_2O_3$) surface-coated ferrite ($Fe_3O_4$), i.e., magnetite, particles were made by suspending the magnetite at concentration of 20 mg/mL in a solution of 50 mM HCl-2 mM $AlCl_3$. To this solution is added an equal volume of 2M $NH_4OH$ and mixed rapidly, and this mixed solution is incubated for 1 hour at room temperature. The particles were concentrated by magnetic field, the supernatant is discarded, and the magnetic particles were resuspended in water at a concentration of 20 mg per mL. The wash process was repeated a second time. The particle pellet was then resuspended in 100 mM $Na_2CO_3$ and incubated at least overnight and stored in this buffer until slides are made as described in this example. Prior to mixing the particles with agarose, the particles are magnetically pelleted from the carbonate buffer, washed twice (resuspension-pelleting) in water at a concentration of 20 mg/mL.

Other metal oxide coatings may be formed by using an appropriate metal salt, instead of the aluminum chloride, in this method. For example, zirconium chloride ($ZrCl_4$) forms zirconium oxide ($ZrO_2$), barium chloride ($BaCl_2$) forms barium oxide, calcium chloride ($CaCl_2$)) forms calcium oxide (CaO), cadmium chloride ($CdCl_2$) forms cadmium oxide (CdO), cobalt chloride ($CoCl_2$) forms cobalt oxide (CoO), ferrous chloride ($FeCl_2$) forms ferrous oxide (FeO), magnesium chloride ($MgCl_2$) forms magnesium oxide (MgO), nickel chloride ($NiCl_2$) forms nickel oxide (NiO), and zinc sulfate ($ZnSO_4$) forms zinc oxide (ZnO).

Example 19

Hybridization of Cy3 Labeled Amplicon Derived from Exon 2 of HLA-B

The slides were prepared for hybridization by wetting the slide in 2×SSC for one hour, air dried. Applied to the slide was 40 uL of following "prehybridization solution" consisting of 50 mM Boric acid, 10 mM sodium tetraborate, 10 mM NaF, 1 mM $NaH_2PO_4$, 0.1% Tween-20, 100 ug/mL of Herring Sperm DNA, and 5×Denhardts Solution, 3×SSC for 2 hrs at room temperature. The probe is then mixed with the following solution, 50 mM Boric acid, 10 mM sodium tetraborate, 10 mM NaF, 1 mM $NaH_2PO_4$, 0.1% Tween-20, 100 ug/mL of Herring Sperm DNA, and 5×Denhardts Solution. Forty microliters of this probe mix was applied to each slide and put under a glass coverslip, and incubated in a humidity chamber at room temperature for 16 hours. The slide was rinsed in water, air dried, then the slide was hybridized with 40 uL (under glass coverslip). The hybridization solution was 15 uL of PCR solution (target source) added to hybridization solution with final concentrations of 2×SSC, 10% Denhardts reagent, 100 ug of herring sperm DNA, 0.01% sodium lauroyl sarcosine. Post hybridization processing of the microarrays is a 20 min soak in 2×SSC followed by a 5 min soak in 1×SSC, and 2 min treatment in 0.2×SSC.

Probes are sequence variants 9-12 (SEQ ID NOS: 33-36) of the ninth codon of exon 2 from human HLA-B as shown in Table 5. Probe variants 9 and 10 also are from codon 9 of HLA-B, however, the sequences are from the antisense strand and are numbered nucleotides 102 thru 90 and 101 through 90, respectively. They span codons 6-10 or directionally codons 10-6. Probe variants 11 and 12 are mixed to get a positive control. They are sense strand sequences for also from HLA-B exon 2 and span odons 72-75 Targets are Cy3-labeled amplicons from a 30 cycle PCR derived from exon 2 of HLA-B.

TABLE 5

| Probe | Sequence | SEQ ID NO |
|---|---|---|
| Variant 9 | GGTGTAGAAATAC | 33 |
| Variant 10 | GTGTGGAAATAC | 34 |
| Variant 11 | CAGACTGACCGA | 35 |
| Variant 12 | CAGACTTACCGA | 36 |

FIGS. 12A-12E are hybridization arrays showing hybridization of the various amplicons to the probes adsorbed to various surfaces, such as, aminopropylsilane, ferrite particles and ferrite particles coated with a metal oxide of aluminum, magnesium, zinc or zirconium. Relative intensity scoring of the hybridization onto the microarrays is shown in Table 6. All intensity numbers are the average of six arrays.

TABLE 6

| Slide surface chemistry | Cy3 Hyb. signal | Probe1/ Probe2 | Probe1/ Probe3 | Probe1/ Probe4&5 | Probe4&5/ Probe2 | Probe4&5/ Probe3 | Cy5 Print signal |
|---|---|---|---|---|---|---|---|
| Aminopropylsilane | — | 33.3 | 2458.3 | 3.5 | 9.6 | 712.4 | — |
| Probe 1: cd9 V9 | 4425.0 | — | — | — | — | — | 42884.2 |
| Probe 2: cd9 V10 | 132.7 | — | — | — | — | — | 61795.2 |
| Probe 3: nonsense | 1.8 | — | — | — | — | — | 59768.0 |
| Probe 4&5: V11-12 | 1282.3 | — | — | — | — | — | 65535.0 |
| Ferrite surface (FIG. 12A) | — | 9.0 | 8.0 | 1.7 | 5.1 | 6.1 | — |
| Probe 1: cd9 V9 | 535.3 | — | — | — | — | — | 57289.3 |
| Probe 2: cd9 V10 | 59.5 | — | — | — | — | — | 65535.0 |
| Probe 3: nonsense | 50.5 | — | — | — | — | — | 52367.8 |
| Probe 4&5: V11-12 | 306.3 | — | — | — | — | — | 65535.0 |
| Metal oxide coating | | | | | | | |
| Aluminum (FIG. 12B) | — | 17.9 | 21.5 | 2.5 | 7.1 | 8.5 | — |
| Probe 1: cd9 V9 | 1214.8 | — | — | — | — | — | 62813.0 |
| Probe 2: cd9 V10 | 67.7 | — | — | — | — | — | 64612.2 |
| Probe 3: nonsense | 56.5 | — | — | — | — | — | 62754.5 |
| Probe 4&5: V11-12 | 478.3 | — | — | — | — | — | 65535.0 |
| Magnesium (FIG. 12C) | — | 8.3 | 7.6 | 1.5 | 5.6 | 5.1 | — |
| Probe 1: cd9 V9 | 510.5 | — | — | — | — | — | 37601.5 |
| Probe 2: cd9 V10 | 61.8 | — | — | — | — | — | 53514.5 |
| Probe 3: nonsense | 67.3 | — | — | — | — | — | 35571.8 |
| Probe 4&5: V11-12 | 346.0 | — | — | — | — | — | 65535.0 |
| Zinc (FIG. 12D) | — | 7.1 | 15.4 | 2.3 | 3.1 | 6.7 | — |
| Probe 1: cd9 V9 | 1122.3 | — | — | — | — | — | 65535.0 |
| Probe 2: cd9 V10 | 159.3 | — | — | — | — | — | 65535.0 |
| Probe 3: nonsense | 72.8 | — | — | — | — | — | 63180.7 |
| Probe 4&5: V11-12 | 487.8 | — | — | — | — | — | 65535.0 |
| Zirconium (FIG. 12E) | — | — | — | 1.4 | — | — | — |
| Probe 1: cd9 V9 | 528.8 | — | — | — | — | — | 58579.2 |
| Probe 2: cd9 V10 | 0.0 | — | — | — | — | — | 64048.3 |
| Probe 3: nonsense | 0.2 | — | — | — | — | — | 58300.2 |
| Probe 4&5: V11-12 | 382.3 | — | — | — | — | — | 65535.0 |

Any patents or publications mentioned in this specification are indicative of the level of those skilled in the art to which the invention pertains. Further, these patents and publications are incorporated by reference herein to the same extent as if each individual publication was specifically and individually incorporated by reference.

One skilled in the art would appreciate readily that the present invention is well adapted to carry out the objects and obtain the ends and advantages mentioned, as well as those objects, ends and advantages inherent herein. Changes therein and other uses which are encompassed within the spirit of the invention as defined by the scope of the claims will occur to those skilled in the art.

What is claimed is:

1. A method for identifying a nucleotide sequence to which a nucleotide-binding protein binds comprising:
   contacting the biomolecular hybridization device with a nucleotide-binding protein under conditions that permit binding; wherein the biomolecular hybridization device comprises:
   a substrate having a surface of functional groups permanently and covalently attached thereto;
   an adsorbed monolayer of unmodified, single-stranded oligonucleotides all of which are 10 to about 24 bases in length as a saturated film of constrained oligonucleotides on the surface via direct non-covalent phosphate-surface adsorptive contact of substantially all phosphate groups of each oligonucleotide; wherein each constrained oligonucleotide base plane is presented from the surface in a manner effective to dissociably hybridize to a complementary single-stranded nucleic acid with asymmetric, non-helical base pairing without alteration of the oligonucleotide base plane presentation and without oligonucleotide phosphate group dissociation from the surface; wherein the hybridized oligonucleotides are fixed into an asymmetric, non-helical duplex; and
   a single-stranded nucleic acid reversibly hybridized to at least one of said single-stranded oligonucleotides as a non-helical duplex of 10 to about 24 base pairs long adsorbed to the surface;
   eluting formed duplex-protein complex(es) from the surface with a salt solution with an ionic strength of an aqueous solution of from about 1 M to about 5 M NaCl; and
   sequencing at least one strand of the eluted nucleic acid duplex.

2. The method of claim 1, wherein the biomolecular hybridization device further comprises a non-hybridizing poly-T sequence at one or both of the 5' or 3' end of the oligonucleotides such that the adsorbed oligonucleotides are each about 30 bases in length.

3. The method of claim 1, wherein the biomolecular hybridization device further comprises a capping material disposed on the surface.

4. The method of claim 3, wherein the capping material is a surfactant or an acid anhydride.

5. The method of claim 1, wherein the single-stranded nucleic acid is DNA or RNA.

6. The method of claim 1, wherein the phosphate groups adsorb to the surface at a density of one phosphate group per about 0.5 square nanometers to less than about 1 square nanometer of surface.

7. The method of claim 1, wherein the functional groups form a positively charged, polar or negatively charged hydrophilic surface or form a hydrophobic surface.

8. The method of claim 7, wherein the surface comprises an organic material or an inorganic material.

9. A method for identifying a nucleotide sequence to which a nucleotide-binding protein binds comprising:
contacting the biomolecular hybridization device with a nucleotide-binding protein under conditions that permit binding; wherein the biomolecular hybridization device comprises:
a substrate having a surface of functional groups permanently and covalently attached thereto; and
an adsorbed monolayer of unmodified, single-stranded oligonucleotides all of which are about 30 bases in length as a saturated film of constrained oligonucleotides on the surface via direct non-covalent phosphate-surface adsorptive contact of substantially all phosphate groups of each oligonucleotide;
wherein the constrained oligonucleotides each have a targeted, hybridizing domain of 10 to about 24 bases and a non-targeted, non-hybridizing domain of bases flanking one or both of the 5' or 3' ends thereof such that each constrained oligonucleotide base plane within the targeted domain is presented from the surface in a manner effective to dissociably hybridize to a complementary single-stranded nucleic acid target with asymmetric, non-helical base pairing without alteration of the oligonucleotide base plane presentation and without oligonucleotide phosphate group dissociation from the surface;
a single-stranded nucleic acid reversibly hybridized to at least one of said single-stranded oligonucleotides as a non-helical duplex of 10 to about 24 base pairs long adsorbed to the surface;
eluting formed duplex-protein complex(es) from the surface with a salt solution with an ionic strength of an aqueous solution of from about 1 M to about 5 M NaCl; and
sequencing at least one strand of the eluted nucleic acid duplex.

10. The method of claim 9, wherein the biomolecular hybridization device further comprises a capping material disposed on the surface.

11. The method of claim 10, wherein the capping material is a surfactant or an acid anhydride.

12. The method of claim 9, wherein the single-stranded nucleic acid is DNA or RNA.

13. The method of claim 9, wherein the functional groups form a positively charged, polar or negatively charged hydrophilic surface or form a hydrophobic surface.

14. The method of claim 13, wherein the surface comprises an organic material or an inorganic material.

15. A method for identifying a nucleotide sequence to which a nucleotide-binding protein binds comprising:
contacting the biomolecular hybridization device with a nucleotide-binding protein under conditions that permit binding; wherein the biomolecular hybridization device comprises:
a substrate having an aminosilanized surface permanently and covalently attached thereto; and
an adsorbed monolayer of unmodified single-stranded oligonucleotides all of which comprise 10 to 24 bases in length adsorbed to the aminosilanized surface as a saturated film of constrained oligonucleotides on the surface via direct non-covalent phosphate-surface adsorptive contact of substantially all phosphate groups of each oligonucleotide at a density of one phosphate group per about 0.5 square nanometers to less than about 1 square nanometer of surface, wherein each constrained oligonucleotide base plane is presented from the surface in a manner effective to dissociably hybridize to a complementary single-stranded nucleic acid with asymmetric, non-helical base pairing without alteration of the oligonucleotide base plane presentation and without oligonucleotide phosphate group dissociation from the surface;
a single-stranded nucleic acid reversibly hybridized to at least one of said single-stranded oligonucleotides as a non-helical duplex of 10 to about 24 base pairs long adsorbed to the surface;
eluting formed duplex-protein complex(es) from the surface with a salt solution with an ionic strength of an aqueous solution of from about 1 M to about 5 M NaCl; and
sequencing at least one strand of the eluted nucleic acid duplex.

16. The method of claim 15, wherein the biomolecular hybridization device further comprises a non-hybridizable poly-T sequence at one or both of the 5' or 3' end of the oligonucleotides such that the adsorbed oligonucleotides are each about 30 bases in length.

17. The method of claim 16, wherein the biomolecular hybridization device further comprises a single-stranded DNA or RNA reversibly hybridized to the oligonucleotide as a non-helical duplex of 10 to 24 base pairs long adsorbed to the surface.

18. The method of claim 15, wherein the biomolecular hybridization device further comprises a capping material disposed on the surface.

19. The method of claim 18, wherein the capping material is a surfactant or an acid anhydride.

* * * * *

SEQUENCE LISTING

```
<160> NUMBER OF SEQ ID NOS: 36

<210> SEQ ID NO 1
<211> LENGTH: 12
<212> TYPE: DNA
<213> ORGANISM: Artificial Sequence
<220> FEATURE:
<223> OTHER INFORMATION: Oligonucleotide wt-12-as

<400> SEQUENCE: 1
ctgtagtggg cg                                                          12

<210> SEQ ID NO 2
<211> LENGTH: 12
<212> TYPE: DNA
<213> ORGANISM: Artificial Sequence
<220> FEATURE:
<223> OTHER INFORMATION: Oligonucleotide mt-12-as

<400> SEQUENCE: 2
ctgtagaggg cg                                                          12

<210> SEQ ID NO 3
<211> LENGTH: 12
<212> TYPE: DNA
<213> ORGANISM: Artificial Sequence
<220> FEATURE:
<223> OTHER INFORMATION: Oligonucleotide scr-12-as

<400> SEQUENCE: 3
gtcgtggagc gt                                                          12

<210> SEQ ID NO 4
<211> LENGTH: 24
<212> TYPE: DNA
<213> ORGANISM: Artificial Sequence
<220> FEATURE:
<223> OTHER INFORMATION: Oligonucleotide wt-24-a

<400> SEQUENCE: 4
ctgtagtggg cgtcctgctg ttcc                                             24

<210> SEQ ID NO 5
<211> LENGTH: 24
<212> TYPE: DNA
<213> ORGANISM: Artificial Sequence
<220> FEATURE:
<223> OTHER INFORMATION: Oligonucleotide mt-24-as

<400> SEQUENCE: 5
ctgtagaggg cgtccagctg ttcc                                             24

<210> SEQ ID NO 6
<211> LENGTH: 24
<212> TYPE: DNA
<213> ORGANISM: Artificial Sequence
<220> FEATURE:
```

<223> OTHER INFORMATION: Oligonucleotide scr-24-as

<400> SEQUENCE: 6
tggtgcggtg acaagctcct cctg                                        24

<210> SEQ ID NO 7
<211> LENGTH: 12
<212> TYPE: DNA
<213> ORGANISM: Artificial Sequence
<220> FEATURE:
<223> OTHER INFORMATION: Oligonucleotide wt-12-s

<400> SEQUENCE: 7
cgcccactac ag                                                     12

<210> SEQ ID NO 8
<211> LENGTH: 12
<212> TYPE: DNA
<213> ORGANISM: Artificial Sequence
<220> FEATURE:
<223> OTHER INFORMATION: Oligonucleotide mt-12-s

<400> SEQUENCE: 8
cgccctctac ag                                                     12

<210> SEQ ID NO 9
<211> LENGTH: 12
<212> TYPE: DNA
<213> ORGANISM: Artificial Sequence
<220> FEATURE:
<223> OTHER INFORMATION: Oligonucleotide scr-12-s

<400> SEQUENCE: 9
acgctccacg ac                                                     12

<210> SEQ ID NO 10
<211> LENGTH: 24
<212> TYPE: DNA
<213> ORGANISM: Artificial Sequence
<220> FEATURE:
<223> OTHER INFORMATION: Oligonucleotide wt-24-s

<400> SEQUENCE: 10
ggaacagcag gacgcccact acag                                        24

<210> SEQ ID NO 11
<211> LENGTH: 24
<212> TYPE: DNA
<213> ORGANISM: Artificial Sequence
<220> FEATURE:
<223> OTHER INFORMATION: Oligonucleotide mt-24-s

<400> SEQUENCE: 11
ggaacagctg gacgccctct acag                                        24

<210> SEQ ID NO 12
<211> LENGTH: 24
<212> TYPE: DNA
<213> ORGANISM: Artificial Sequence
<220> FEATURE:
<223> OTHER INFORMATION: Oligonucleotide scr-24-s

<400> SEQUENCE: 12
caggaggagc ttgtcaccgc acca                                        24

```
<210> SEQ ID NO 13
<211> LENGTH: 10
<212> TYPE: DNA
<213> ORGANISM: Artificial Sequence
<220> FEATURE:
<223> OTHER INFORMATION: Oligonucleotide wt-10-s-(-3')

<400> SEQUENCE: 13
cgcccactac                                                              10

<210> SEQ ID NO 14
<211> LENGTH: 10
<212> TYPE: DNA
<213> ORGANISM: Artificial Sequence
<220> FEATURE:
<223> OTHER INFORMATION: Oligonucleotide wt-10-s-(-5')

<400> SEQUENCE: 14
cccactacag                                                              10

<210> SEQ ID NO 15
<211> LENGTH: 11
<212> TYPE: DNA
<213> ORGANISM: Artificial Sequence
<220> FEATURE:
<223> OTHER INFORMATION: Oligonucleotide wt-11-s-(-3')

<400> SEQUENCE: 15
cgcccactac a                                                            11

<210> SEQ ID NO 16
<211> LENGTH: 11
<212> TYPE: DNA
<213> ORGANISM: Artificial Sequence
<220> FEATURE:
<223> OTHER INFORMATION: Oligonucleotide wt-11-s-(-5')

<400> SEQUENCE: 16
gcccactaca g                                                            11

<210> SEQ ID NO 17
<211> LENGTH: 14
<212> TYPE: DNA
<213> ORGANISM: Artificial Sequence
<220> FEATURE:
<223> OTHER INFORMATION: Oligonucleotide wt-14-s

<400> SEQUENCE: 17
gacgcccact acag                                                         14

<210> SEQ ID NO 18
<211> LENGTH: 16
<212> TYPE: DNA
<213> ORGANISM: Artificial Sequence
<220> FEATURE:
<223> OTHER INFORMATION: Oligonucleotide wt-16-s

<400> SEQUENCE: 18
aggacgccca ctacag                                                       16

<210> SEQ ID NO 19
<211> LENGTH: 18
<212> TYPE: DNA
<213> ORGANISM: Artificial Sequence
<220> FEATURE:
<223> OTHER INFORMATION: Oligonucleotide wt-18-s
```

<400> SEQUENCE: 19
gcaggacgcc cactacag                                                 18

<210> SEQ ID NO 20
<211> LENGTH: 20
<212> TYPE: DNA
<213> ORGANISM: Artificial Sequence
<220> FEATURE:
<223> OTHER INFORMATION: Oligonucleotide wt-20-s-(-3')

<400> SEQUENCE: 20
aacagcagga cgcccactac                                               20

<210> SEQ ID NO 21
<211> LENGTH: 20
<212> TYPE: DNA
<213> ORGANISM: Artificial Sequence
<220> FEATURE:
<223> OTHER INFORMATION: Oligonucleotide wt-20-s-(-5')

<400> SEQUENCE: 21
cagcaggacg cccactacag                                               20

<210> SEQ ID NO 22
<211> LENGTH: 22
<212> TYPE: DNA
<213> ORGANISM: Artificial Sequence
<220> FEATURE:
<223> OTHER INFORMATION: Oligonucleotide wt-22-s-(-3')

<400> SEQUENCE: 22
ggaacagcag gacgcccact ac                                            22

<210> SEQ ID NO 23
<211> LENGTH: 22
<212> TYPE: DNA
<213> ORGANISM: Artificial Sequence
<220> FEATURE:
<223> OTHER INFORMATION: Oligonucleotide wt-22-s-(-5')

<400> SEQUENCE: 23
aacagcagga cgcccactac ag                                            22

<210> SEQ ID NO 24
<211> LENGTH: 28
<212> TYPE: DNA
<213> ORGANISM: Artificial Sequence
<220> FEATURE:
<223> OTHER INFORMATION: Oligonucleotide wt-28-s

<400> SEQUENCE: 24
caggaacagc aggacgccca ctacagtt                                      28

<210> SEQ ID NO 25
<211> LENGTH: 30
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 25
ttttttttca gatctccaag actttttttt                                    30

<210> SEQ ID NO 26
<211> LENGTH: 30

```
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 26 tttttttca gatcttcaag acttttttt                                   30

<210> SEQ ID NO 27
<211> LENGTH: 30
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 27 tttttttca gatctacaag gctttttttt                                  30

<210> SEQ ID NO 28
<211> LENGTH: 30
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 28 tttttttca gatctgcaag acttttttt                                   30

<210> SEQ ID NO 29
<211> LENGTH: 30
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 29 tttttttca gatctgcaag gcttttttt                                   30

<210> SEQ ID NO 30
<211> LENGTH: 30
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 30 tttttttcg gaacatgaag gcttttttt                                   30

<210> SEQ ID NO 31
<211> LENGTH: 30
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 31 tttttttca gaagtacaag cgtttttttt                                  30

<210> SEQ ID NO 32
<211> LENGTH: 30
<212> TYPE: DNA
<213> ORGANISM: Artificial Sequence
<220> FEATURE:
<223> OTHER INFORMATION: Oligonucleotide variant of human HLA-B exon 2

<400> SEQUENCE: 32
```

```
tttttttca gatctacaag actttttttt                                      30
```

```
<210> SEQ ID NO 33
<211> LENGTH: 15
<212> TYPE: DNA
<213> ORGANISM: Artificial Sequence
<220> FEATURE:
<223> OTHER INFORMATION: Oligonucleotide variant of human HLA-B codon 9,
      exon 2

<400> SEQUENCE: 33
ggtgtagaaa tactc                                                     15

<210> SEQ ID NO 34
<211> LENGTH: 15
<212> TYPE: DNA
<213> ORGANISM: Artificial Sequence
<220> FEATURE:
<223> OTHER INFORMATION: Oligonucleotide variant of human HLA-B codon 9,
      exon 2

<400> SEQUENCE: 34
tgtgtggaaa tactc                                                     15

<210> SEQ ID NO 35
<211> LENGTH: 12
<212> TYPE: DNA
<213> ORGANISM: Artificial Sequence
<220> FEATURE:
<223> OTHER INFORMATION: Oligonucleotide variant of human HLA-B codon 9,
      exon 2

<400> SEQUENCE: 35
cagactgacc ga                                                        12

<210> SEQ ID NO 36
<211> LENGTH: 12
<212> TYPE: DNA
<213> ORGANISM: Artificial Sequence
<220> FEATURE:
<223> OTHER INFORMATION: Oligonucleotide variant of human HLA-B codon 9,
      exon 2

<400> SEQUENCE: 36
cagacttacc ga                                                        12
```